United States Patent
Lee et al.

(10) Patent No.: US 12,323,988 B2
(45) Date of Patent: Jun. 3, 2025

(54) METHOD FOR PERFORMING BLIND DECODING ON PHYSICAL DOWNLINK CONTROL CHANNEL CANDIDATE IN WIRELESS COMMUNICATION SYSTEM, AND APPARATUS THEREFOR

(71) Applicant: LG ELECTRONICS INC., Seoul (KR)

(72) Inventors: Hyunho Lee, Seoul (KR); Duckhyun Bae, Seoul (KR); Yunjung Yi, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 675 days.

(21) Appl. No.: 17/263,313

(22) PCT Filed: Aug. 12, 2019

(86) PCT No.: PCT/KR2019/010236
§ 371 (c)(1),
(2) Date: Jan. 26, 2021

(87) PCT Pub. No.: WO2020/032776
PCT Pub. Date: Feb. 13, 2020

(65) Prior Publication Data
US 2021/0168781 A1    Jun. 3, 2021

Related U.S. Application Data

(60) Provisional application No. 62/830,530, filed on Apr. 7, 2019, provisional application No. 62/827,239, filed (Continued)

(51) Int. Cl.
*H04W 72/23* (2023.01)
*G06N 3/04* (2023.01)
(Continued)

(52) U.S. Cl.
CPC .............. *H04W 72/23* (2023.01); *G06N 3/04* (2013.01); *G06N 3/08* (2013.01); *H04L 25/02* (2013.01)

(58) Field of Classification Search
CPC ............ H04L 25/02; G06N 3/08; G06N 3/04; H04W 72/23
See application file for complete search history.

(56) References Cited

U.S. PATENT DOCUMENTS

2018/0227074 A1\* 8/2018 Sun ......................... H04L 5/001
2018/0227156 A1    8/2018 Papasakellariou
(Continued)

FOREIGN PATENT DOCUMENTS

KR    1020180057472    5/2018

OTHER PUBLICATIONS

Ericsson, "Remaining issues of search space," R1-1807247, 3GPP TSG-RAN WG1 Meeting #93, Busan, Korea, dated May 21-25, 2018, 9 pages.
(Continued)

*Primary Examiner* — Dai Phuong
(74) *Attorney, Agent, or Firm* — Fish & Richardson P.C.

(57) ABSTRACT

A method of performing blind decoding for a physical downlink control channel (PDCCH) candidate and a device therefor in a wireless communication system are disclosed. Specifically, the method performed by a user equipment (UE) includes receiving, from a base station, configuration information related to a search space set, receiving, from the base station, a control resource set, and performing a blind decoding for a plurality of PDCCH candidates included in the control resource set based on the configuration information, wherein a demodulation reference signal (DMRS) is
(Continued)

received per control resource set and is used in a channel estimation for a demodulation of the plurality of PDCCH candidates.

3 Claims, 14 Drawing Sheets

Related U.S. Application Data on Apr. 1, 2019, provisional application No. 62/716,993, filed on Aug. 10, 2018.

(51) Int. Cl.
*G06N 3/08* (2023.01)
*H04L 25/02* (2006.01)

(56) References Cited

U.S. PATENT DOCUMENTS

| | | | |
|---|---|---|---|
| 2019/0098576 A1* | 3/2019 | Papasakellariou | H04L 1/0027 |
| 2021/0067268 A1* | 3/2021 | Seo | H04L 1/0052 |
| 2021/0204308 A1* | 7/2021 | Takeda | H04W 72/1273 |
| 2021/0352501 A1* | 11/2021 | Taherzadeh Boroujeni | H04W 24/08 |

OTHER PUBLICATIONS

Nokia, Nokia Shanghai Bell, "Remaining details on search space," R1-1720507, 3GPP TSG RAN WG1 Meeting 91, Reno, USA, dated Nov. 27-Dec. 1, 2017, 10 pages.

PCT International Search Report in International Appln. No. PCT/KR2019/010236, dated Dec. 16, 2019, 7 pages (with English translation).

\* cited by examiner

METHOD FOR PERFORMING BLIND DECODING ON PHYSICAL DOWNLINK CONTROL CHANNEL CANDIDATE IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2019/010236, filed on Aug. 12, 2019, which claims the benefit of U.S. Provisional Application No. 62/716,993, filed on Aug. 10, 2018, No. 62/827,239, filed on Apr. 1, 2019, and No. 62/830,530, filed on Apr. 7, 2019, the contents of which are all hereby incorporated by reference herein in their entirety.

TECHNICAL FIELD

The present disclosure relates to a wireless communication system, and more particularly to a method of performing blind decoding for a physical downlink control channel (PDCCH) candidate and a device therefor.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure provides a method of performing channel estimation using a demodulation reference signal configured per control resource set upon PDCCH blind decoding, and a device therefor.

The technical objects to be achieved by the present disclosure are not limited to those that have been described hereinabove merely by way of example, and other technical objects that are not mentioned can be clearly understood from the following descriptions by those skilled in the art, to which the present disclosure pertains.

Technical Solution

In one aspect of the present disclosure, there is provided a method of performing a blind decoding for a physical downlink control channel (PDCCH) candidate in a wireless communication system. The method performed by a user equipment (UE) comprises receiving, from a base station, configuration information related to a search space set, receiving, from the base station, a control resource set, and performing a blind decoding for a plurality of PDCCH candidates included in the control resource set based on the configuration information, wherein a demodulation reference signal (DMRS) is received per control resource set and is used in a channel estimation for a demodulation of the plurality of PDCCH candidates.

The demodulation reference signal may be received on a first symbol or the first symbol and a second symbol of the control resource set.

Whether to apply the demodulation reference signal may be configured on a per search space set basis, on a per control resource set basis, or on a per specific time basis.

The plurality of PDCCH candidates may be PDCCH candidates of a specific aggregation level.

The demodulation reference signal may be received over all frequency bands or a specific frequency band of the control resource set.

The demodulation reference signal may be received in a specific pattern.

In another aspect of the present disclosure, there is provided a user equipment (UE) performing a blind decoding for a physical downlink control channel (PDCCH) candidate in a wireless communication system, the UE comprising a radio frequency (RF) unit configured to transmit and receive a radio signal, and a processor functionally connected to the RF unit, wherein the processor is configured to receive, from a base station, configuration information related to a search space set, receive, from the base station, a control resource set, and perform a blind decoding for a plurality of PDCCH candidates included in the control resource set based on the configuration information, wherein a demodulation reference signal (DMRS) is received per control resource set and is used in a channel estimation for a demodulation of the plurality of PDCCH candidates.

The demodulation reference signal may be received on a first symbol or the first symbol and a second symbol of the control resource set.

Whether to apply the demodulation reference signal may be configured on a per search space set basis, on a per control resource set basis, or on a per specific time basis.

The plurality of PDCCH candidates may be PDCCH candidates of a specific aggregation level.

The demodulation reference signal may be received over all frequency bands or a specific frequency band of the control resource set.

The demodulation reference signal may be received in a specific pattern.

Advantageous Effects

The present disclosure can reduce the number of channel estimations by performing channel estimation using a demodulation reference signal configured per control resource set.

The present disclosure can support various service requirements and allow flexible and efficient resource utilization.

Effects that could be achieved by the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

MODE FOR INVENTION

Figure 1:
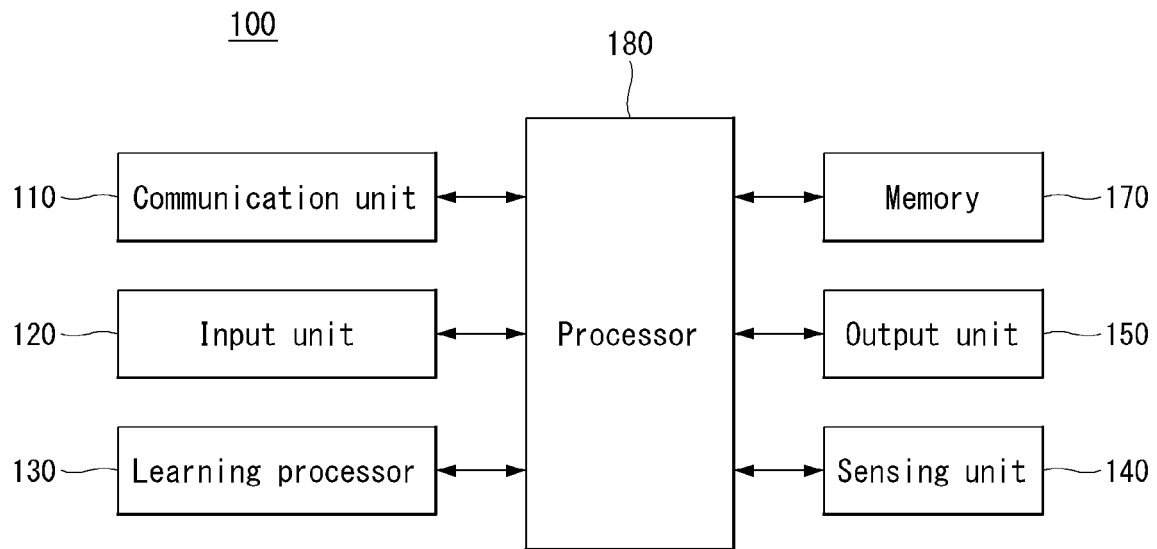
FIG. 1 is a diagram showing an AI device to which a method proposed in the disclosure may be applied.

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method proposed in the disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in the disclosure may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
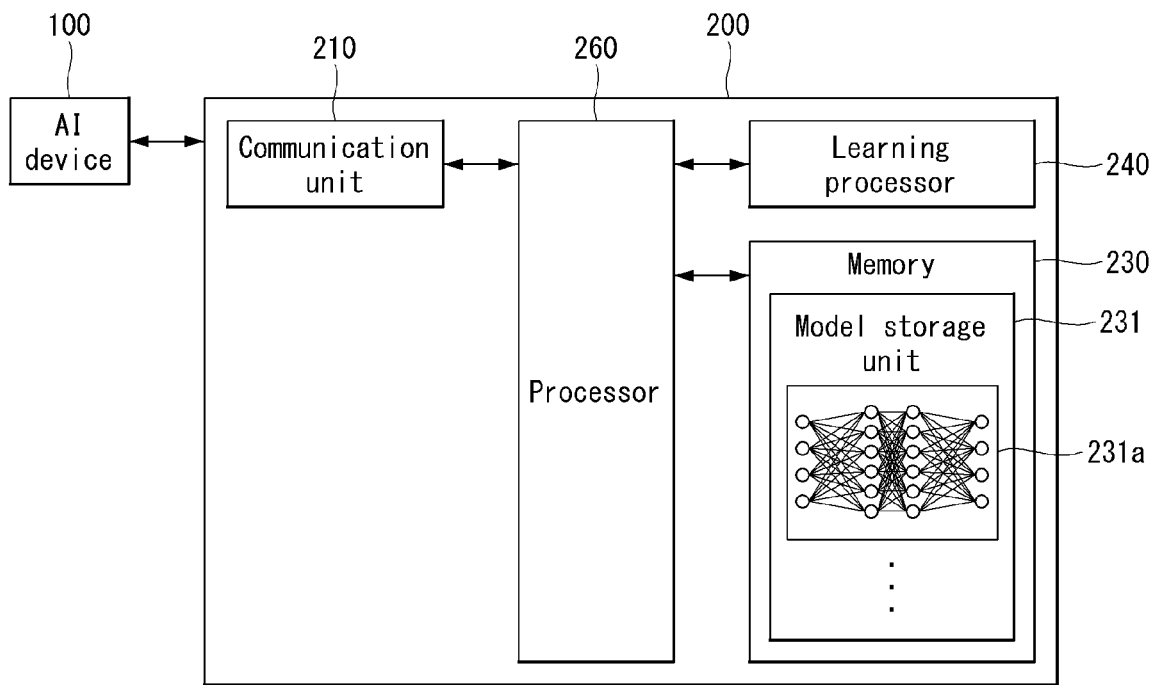
FIG. 2 is a diagram showing an AI server to which a method proposed in the disclosure may be applied.

FIG. 2 is a diagram showing the AI server 200 to which a method proposed in the disclosure may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
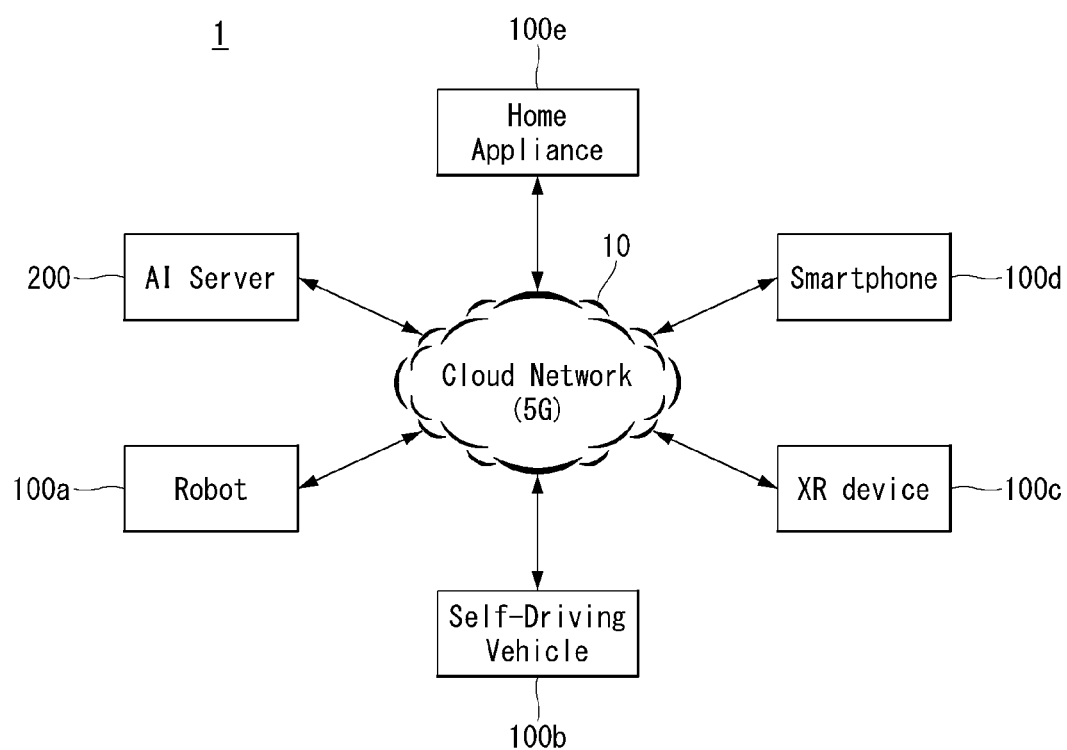
FIG. 3 is a diagram showing an AI system to which a method proposed in the disclosure may be applied.

FIG. 3 is a diagram showing an AI system 1 to which a method proposed in the disclosure may be applied.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously run along a given flow without control of a user or that autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through a LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

As the spread of smartphones and IoT (Internet of Things) terminals is rapidly spreading, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

Figure 4:
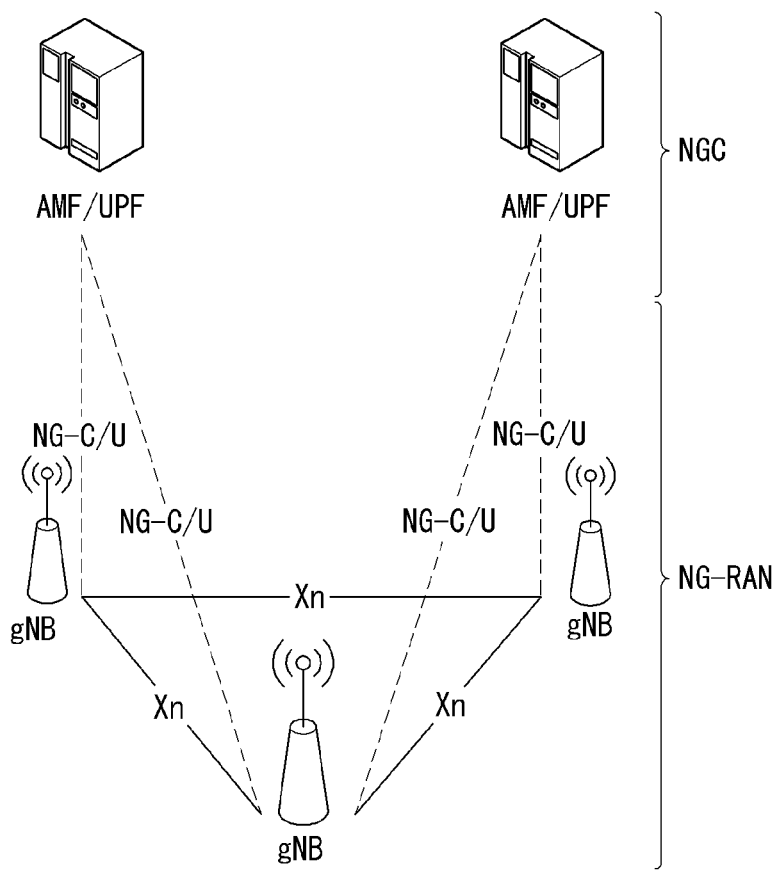
FIG. 4 illustrates an example of an overall structure of an NR system to which a method proposed in the disclosure may be applied.

FIG. 4 illustrates an example of an overall structure of an NR system to which a method proposed in the disclosure may be applied.

Referring to FIG. 4, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f/100) \cdot T_s = 10$ ms. The radio frame consists of ten subframes each having a section of $T_{sf} = (\Delta f_{max} N_f/1000) \cdot T_s = 1$ ms. In this case, there may be a set of UL frames and a set of DL frames.

Figure 5:
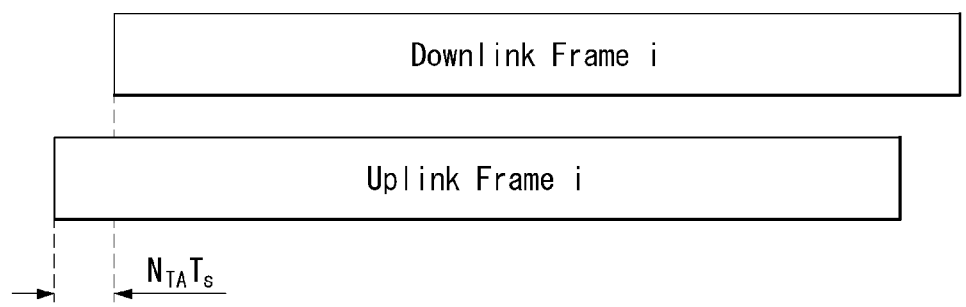
FIG. 5 illustrates the relation between an uplink frame and a downlink frame in a wireless communication system to which a method proposed in the disclosure may be applied.

FIG. 5 illustrates the relation between an uplink frame and a downlink frame in a wireless communication system to which a method proposed in the disclosure may be applied.

As illustrated in FIG. 5, uplink frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots, \mu} - 1\}$ within a subframe and are numbered in increasing order of $n_{s,f}^\mu \in \{0, \ldots, N_{frame}^{slots, \mu} - 1\}$ within a radio frame. One slot consists of consecutive OFDM symbols of $n_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 6:
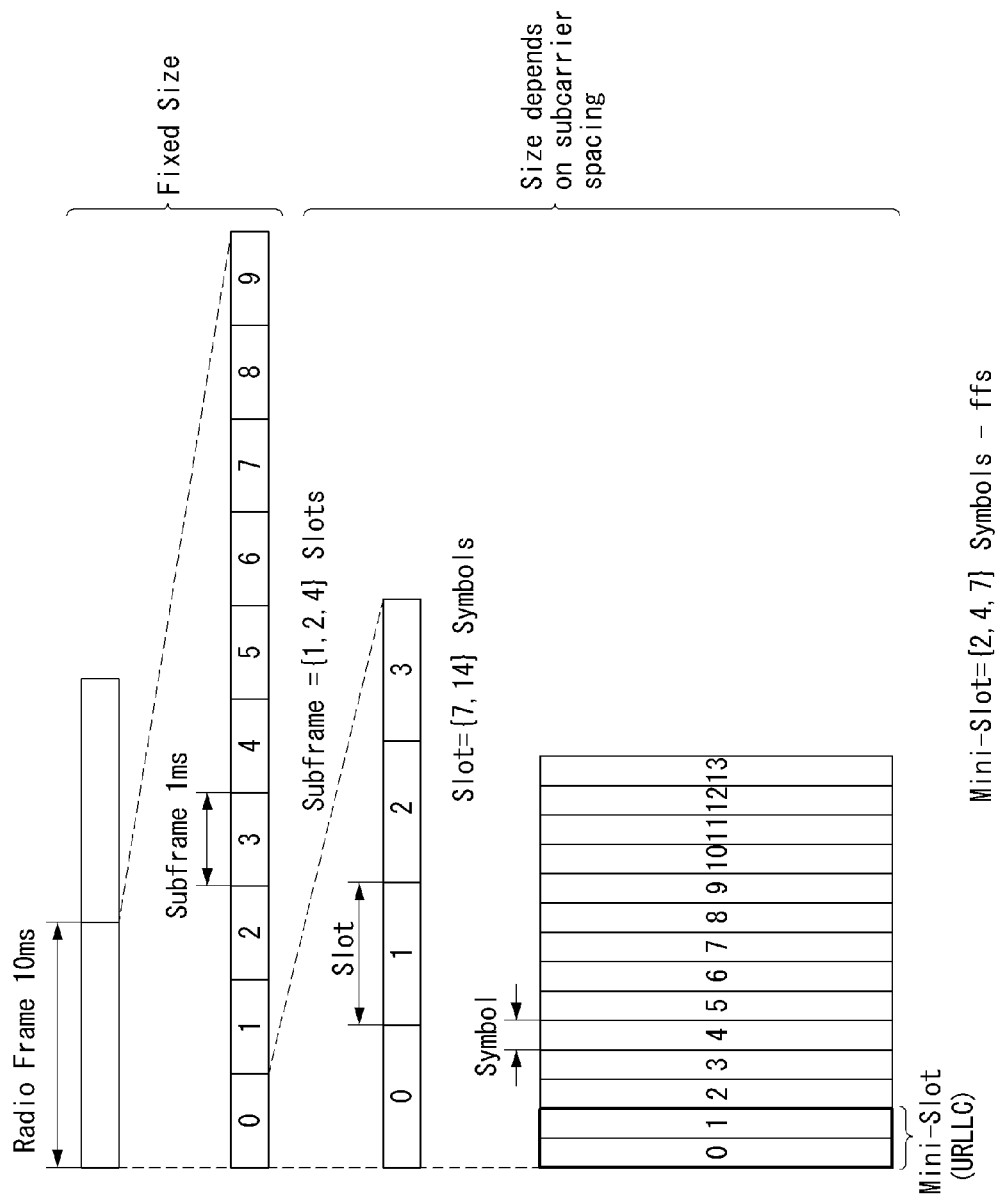
FIG. 6 illustrates an example of a frame structure in an NR system.

FIG. 6 illustrates an example of a frame structure in an NR system. FIG. 6 is merely for convenience of explanation and does not limit the scope of the disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

Figure 7:
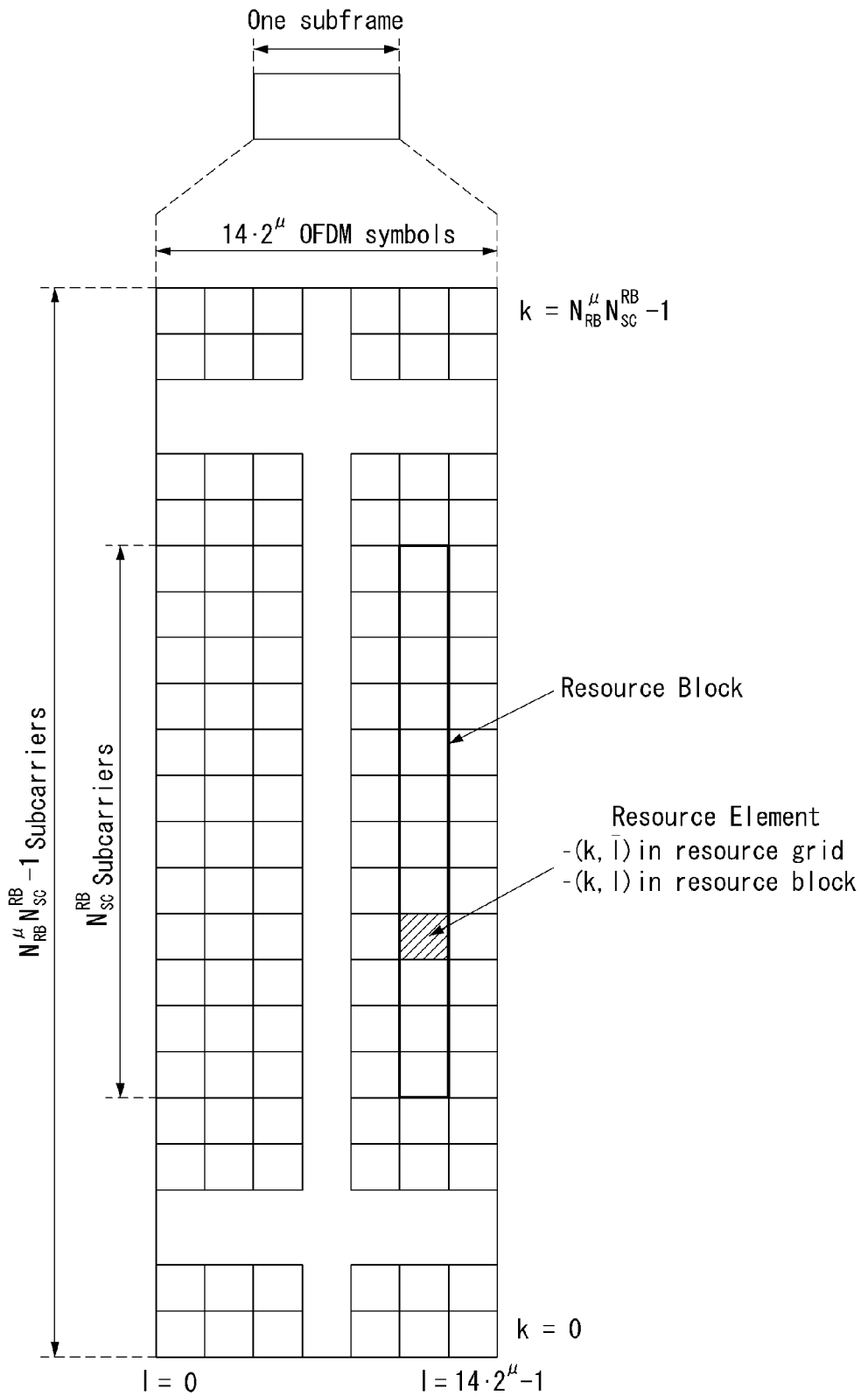
FIG. 7 illustrates an example of a resource grid supported in a wireless communication system to which a method proposed in the disclosure may be applied.

FIG. 7 illustrates an example of a resource grid supported in a wireless communication system to which a method proposed in the disclosure may be applied.

Referring to FIG. 7, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max, \mu}$. $N_{RB}^{max, \mu}$ denotes a maximum transmission bandwidth and may change not only between numerologies but also between uplink and downlink.

Figure 8:
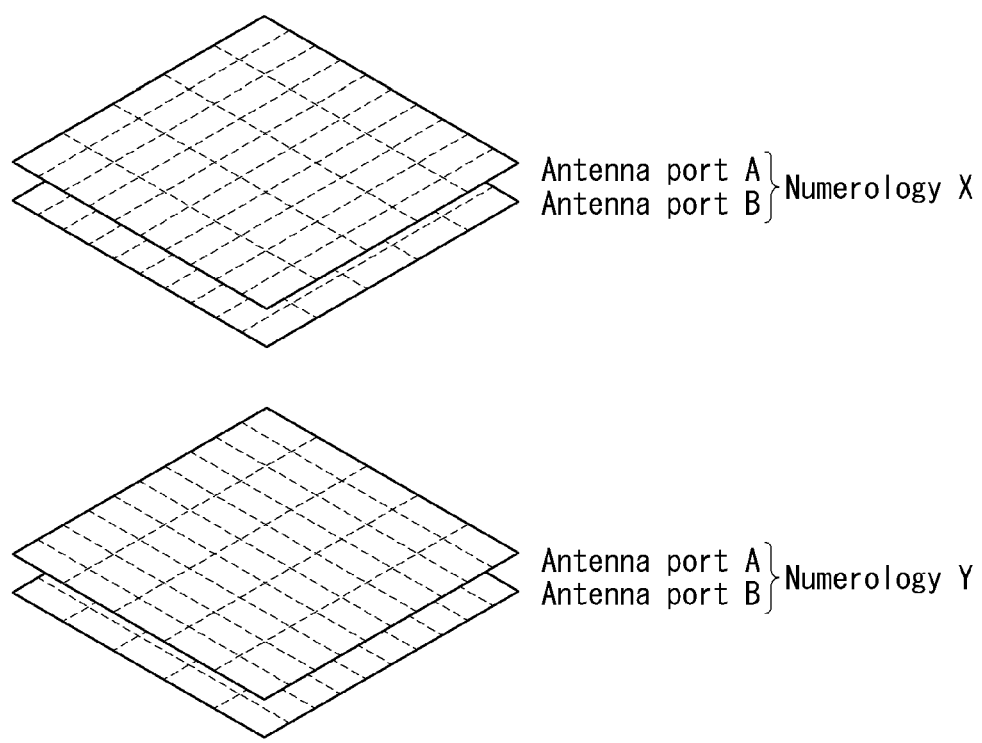
FIG. 8 illustrates examples of a resource grid per antenna port and numerology to which a method proposed in the disclosure may be applied.

In this case, as illustrated in FIG. 8, one resource grid may be configured per numerology μ and antenna port p.

FIG. 8 illustrates examples of a resource grid per antenna port and numerology to which a method proposed in the disclosure may be applied.

Each element of the resource grid for the numerology μ and the antenna port p is called a resource element and is uniquely identified by an index pair (k, l̄) where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k, l̄) is used to refer to a resource element in a slot, where l=0, . . . , $N_{symb}^{\mu}-1$.

The resource element (k, l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

In this case, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

Figure 9:
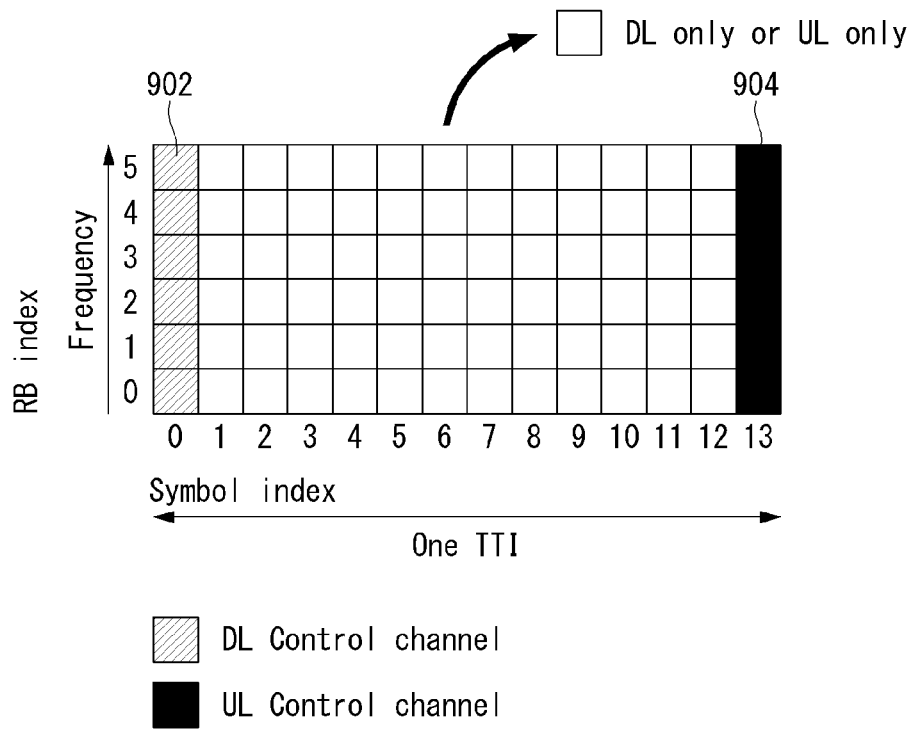
FIG. 9 illustrates an example of a self-contained structure to which a method proposed in the disclosure may be applied.

FIG. 9 illustrates an example of a self-contained structure to which a method proposed in the disclosure may be applied. FIG. 9 is merely for convenience of explanation and does not limit the scope of the disclosure.

Referring to FIG. 9, as in legacy LTE, it is assumed that one transmission unit (e.g., slot, subframe) consists of 14 orthogonal frequency division multiplexing (OFDM) symbols.

In FIG. 9, a region 902 means a downlink control region, and a region 904 means an uplink control region. Further, regions (i.e., regions without separate indication) other than the region 902 and the region 904 may be used for transmission of downlink data or uplink data.

That is, uplink control information and downlink control information may be transmitted in one self-contained slot. On the other hand, in case of data, uplink data or downlink data is transmitted in one self-contained slot.

When the structure illustrated in FIG. 9 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 9, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

Bandwidth Part Operation

If a UE is configured with a SCG, the UE may apply the procedures according to a predefined standard for MCG and SCG (e.g., 3GPP TS 38.213).

When the corresponding procedures are applied for MCG, the terms 'secondary cell', 'secondary cells', 'serving cell' and 'serving cells' in the predefined standard (e.g., 3GPP TS 38.213) refer to secondary cell, secondary cells, serving cell and serving cells belonging to the MCG, respectively.

When the corresponding procedures are applied for SCG, the terms 'secondary cell', 'secondary cells', 'serving cell' and 'serving cells' in clause of the predefined standard refer to secondary cell, secondary cells not including PSCell, serving cell and serving cells belonging to the SCG, respectively. The term 'primary cell' in the predefined standard (e.g., 3GPP TS 38.213) refers to the PSCell of the SCG.

A UE configured for operation in bandwidth parts (BWPs) of a serving cell may be configured for the serving cell with a set of at most four bandwidth parts (BWPs) for receptions by the UE (DL BWP set) in a DL bandwidth and a set of at most four BWPs for transmissions by the UE (UL BWP set) in an UL bandwidth by parameter UL-BWP.

An initial active DL BWP may be defined by a location and number of contiguous PRBs, a subcarrier spacing, and a cyclic prefix, for the control resource set for Type0-PDCCH common search space. For operation on the primary cell, a UE may be provided with an initial UL BWP by higher layer parameter initial-UL-BWP. If the UE is configured with a secondary carrier on the primary cell, the UE may be configured with an initial BWP for a random access procedure on the secondary carrier.

If a UE has a dedicated BWP configuration, the UE can be provided with a first active DL BWP for receptions on the primary cell by higher layer parameter Active-BWP-DL- Pcell and a first active UL BWP for transmissions on the primary cell by higher layer parameter Active-BWP-UL-Pcell.

For each DL BWP or UL BWP in a set of DL BWPs or UL BWPs, respectively, the UE may be configured with the following parameters for the serving cell as defined in a predefined standard (e.g., 3GPP TS 38.211 or 3GPP TS 38.214):
- a subcarrier spacing provided by higher layer parameter DL-BWP-mu or UL-BWP-mu;
- a cyclic prefix provided by higher layer parameter DL-BWP-CP or UL-BWP-CP;
- a number of contiguous PRBs provided by higher layer parameter DL-BWP-BW or UL-BWP-BW, and a PRB offset for a PRB determined by higher layer parameter offset-pointA-low-scs and ref-sc;
- n indexes in a set of DL BWPs or UL BWPs by respective higher layer parameters DL-BWP-index or UL-BWP-index;
- a DCI format 1_0 or DCI format 1_1 detection to a PDSCH reception timing value by higher layer parameter DL-data-time-domain, a PDSCH reception to a HARQ-ACK transmission timing value by higher layer parameter DL-data-DL-acknowledgement, and a DCI 0_0 or DCI 0_1 detection to a PUSCH transmission timing value by higher layer parameter UL-data-time-domain.

For an unpaired spectrum operation, when the DL-BWP-index and the UL-BWP-index are equal, a DL BWP from a set of configured DL BWPs with an index provided by higher layer parameter DL-BWP-index may be paired with a UL BWP from a set of configured UL BWPs with an index provided by higher layer parameter UL-BWP-index. For the unpaired spectrum operation, when a DL-BWP-index of a DL BWP is equal to a UL-BWP-index of a UL BWP, the UE may not expect to receive a configuration where a center frequency for the DL BWP is different a center frequency for the UL BWP.

For each DL BWP in a set of DL BWPs on the primary cell, a UE can be configured with control resource sets for every type of common search space and for UE-specific search space as described in a predefined standard (e.g., 3GPP TS 38.213). The UE may not expect to be configured without a common search space on the PCell or on the PSCell, in the active DL BWP.

For each UL BWP in a set of UL BWPs, the UE can be configured with resource sets for PUCCH transmissions as described in a predefined standard (e.g., 3GPP TS 38.213).

A UE may receive PDCCH and PDSCH in a DL BWP according to a configured subcarrier spacing and a CP length for the DL BWP. The UE may transmit PUCCH and PUSCH in an UL BWP according to a configured subcarrier spacing and a CP length for the UL BWP.

If a bandwidth part indicator field is configured in DCI format 1_1, a bandwidth part indicator field value may indicate the active DL BWP, from the configured DL BWP set, for DL receptions. If a bandwidth part indicator field is configured in DCI format 0_1, a bandwidth part indicator field value may indicate the active UL BWP, from the configured UL BWP set, for UL transmissions.

If the bandwidth part indicator field is configured in DCI format 0_1 or DCI format 1_1 and indicates an UL BWP or a DL BWP different from the active UL BWP or DL BWP, respectively, the UE may have to operate as follows.

For each information field in the received DCI format 0_1 or DCI format 1_1, the UE may operate as follows.

If the size of the information field is smaller than the one required for the DCI format 0_1 or DCI format 1_1 interpretation for the UL BWP or DL BWP that is indicated by the bandwidth part indicator, respectively, the UE may have to prepend zeros to the information field until its size is the one required for the interpretation of the information field for the UL BWP or DL BWP prior to interpreting the DCI format 0_1 or DCI format 1_1 information fields, respectively.

If the size of the information field is larger than the one required for the DCI format 0_1 or DCI format 1_1 interpretation for the UL BWP or DL BWP that is indicated by the bandwidth part indicator, respectively, the UE may have to use a number of least significant bits of DCI format 0_1 or DCI format 1_1 equal to the one required for the UL BWP or DL BWP indicated by the bandwidth part indicator prior to interpreting the DCI format 0_1 or DCI format 1_1 information fields, respectively.

The UE may have to set the active UL BWP or DL BWP to the UL BWP or DL BWP indicated by the bandwidth part indicator in the DCI format 0_1 or DCI format 1_1, respectively.

Only if a corresponding PDCCH is received within the first 3 symbols of a slot, the UE may expect to detect a DCI format 0_1 indicating active UL BWP change or a DCI format 1_1 indicating active DL BWP change.

For the primary cell, a UE can be provided with a default DL BWP by higher layer parameter Default-DL-BWP among the configured DL BWPs. If a UE is not provided with a default DL BWP by higher layer parameter Default-DL-BWP, the default DL BWP is an initial active DL BWP.

If a UE is configured for a secondary cell with higher layer parameter Default-DL-BWP indicating a default DL BWP among the configured DL BWPs and is configured with higher layer parameter BWP-InactivityTimer indicating a timer value, the UE procedures on the secondary cell are same as that on the primary cell using the timer value for the secondary cell and the default DL BWP for the secondary cell.

If a UE is configured by higher layer parameter BWP-InactivityTimer a timer value for the primary cell and the timer is running, the UE increments the timer every interval of 1 millisecond for frequency range 1 or every 0.5 milliseconds for frequency range 2 if the UE does not detect DCI format 1_1 for paired spectrum operation or if the UE does not detect DCI format 1_1 or DCI format 0_1 for unpaired spectrum operation during an interval.

If a UE is configured by higher layer parameter Active-BWP-DL-SCell with a first active DL BWP and by higher layer parameter Active-BWP-UL-SCell with a first active UL BWP on a secondary cell or carrier, the UE may use the indicated DL BWP and the indicated UL BWP on the secondary cell as the respective first active DL BWP and first active UL BWP on the secondary cell or carrier.

For the paired spectrum operation, a UE does not expect to transmit HARQ-ACK on a PUCCH resource indicated by DCI format 1_0 or DCI format 1_1 if the UE changes its active UL BWP on the PCell between a time of a detection of the DCI format 1_0 or the DCI format 1_1 and a time of a corresponding HARQ-ACK transmission on the PUCCH.

A UE does not expect to monitor PDCCH when the UE performs RRM measurements over a bandwidth that is not within the active DL BWP for the UE.

Discontinuous Reception (DRX) Operation

A UE may perform a DRX operation while performing the procedures and/or methods described/proposed above. The UE configured with the DRX discontinuously receives DL signals and thus can reduce power consumption. The DRX may be performed in radio resource control (RRC)_IDLE state, RRC_INACTIVE state, and RRC_CONNECTED state.

RRC_CONNECTED DRX

In RRC_CONNECTED state, DRX is used for discontinuous reception of PDCCH. For convenience of description, DRX performed in the RRC_CONNECTED state is referred to as RRC_CONNECTED DRX.

Figure 10:
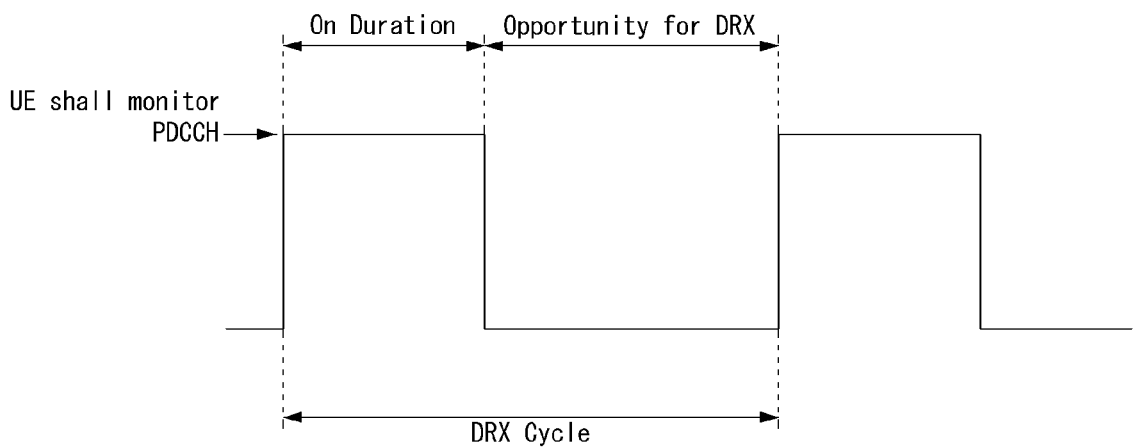
FIG. 10 illustrates a DRX cycle for discontinuous reception of PDCCH.

FIG. 10 illustrates a DRX cycle for discontinuous reception of PDCCH.

Referring to FIG. 10, a DRX cycle consists of an on-duration and an opportunity for DRX. The DRX cycle defines a time interval in which the on-duration is periodically repeated. The on-duration represents a time duration in which the UE monitors to receive PDCCH (or MPDCCH, NPDCCH). If the DRX is configured, the UE performs PDCCH monitoring for the on-duration. If there is a PDCCH that is successfully detected during the PDCCH monitoring, the UE runs an inactivity timer and maintains an awake state. On the other hands, if there is no PDCCH that is successfully detected during the PDCCH monitoring, the UE returns to a sleep state after the on-duration ends. Thus, if the DRX is configured, PDCCH monitoring/reception may be discontinuously performed in a time domain when performing the procedures and/or methods described/proposed above. For example, if the DRX is configured, in the present disclosure, the PDCCH monitoring may be discontinuously performed in activated cell(s) according to DRX configuration. Specifically, if a PDCCH occasion (e.g., a time duration (e.g., one or more consecutive OFDM symbols) configured to monitor PDCCH) corresponds to the on-duration, the PDCCH monitoring may be performed. If the PDCCH occasion corresponds to the opportunity for DRX, the PDCCH monitoring may be omitted. On the other hands, if the DRX is not configured, PDCCH monitoring/reception may be continuously performed in a time domain when performing the procedures and/or methods described/proposed above. For example, if the DRX is not configured, in the present disclosure, a PDCCH reception occasion may be continuously configured. Regardless of whether the DRX is configured, the PDCCH monitoring may be limited in a time duration configured as a measurement gap.

Table 4 shows a process of the UE related to the DRX (RRC_CONNECTED state). Referring to Table U1, DRX configuration information is received via higher layer signaling (e.g., RRC signaling), and whether the DRX is ON/OFF is controlled by a DRX command of an MAC layer. If the DRX is configured, the UE may discontinuously perform PDCCH monitoring when performing the procedures and/or methods described/proposed in the present disclosure, as illustrated in FIG. 10.

TABLE 4

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

Herein, MAC-CellGroupConfig includes configuration information required to configure a medium access control (MAC) parameter for a cell group. MAC-CellGroupConfig may also include configuration information regarding DRX. For example, MAC-CellGroupConfig may include the following information to define DRX.

Value of drx-OnDurationTimer: defines a length of a start duration of a DRX cycle.

Value of drx-InactivityTimer: defines a length of a time duration in which the UE is in an awake state after a PDCCH occasion in which PDCCH indicating initial UL or DL data is detected.

Value of drx-HARQ-RTT-TimerDL: defines a length of a maximum time duration until DL re-transmission is received after DL initial transmission is received.

Value of drx-HARQ-RTT-TimerDL: defines a length of a maximum time duration until a grant for UL re-transmission is received after a grant for UL initial transmission is received.

drx-LongCycleStartOffset: defines a time length and a start time point of a DRX cycle.

drx-ShortCycle (optional): defines a time length of a short DRX cycle.

Herein, if any one of drx-OnDurationTimer, drx-InactivityTimer, drx-HARQ-RTT-TimerDL, and drx-HARQ-RTT-TimerDL is operating, the UE performs PDCCH monitoring every PDCCH occasion while maintaining the awake state.

RRC_IDLE DRX

In RRC_IDLE state and RRC_INACTIVE state, DRX is used to discontinuously receive a paging signal. For convenience of description, DRX performed in the RRC_IDLE (or RRC_INACTIVE) state is referred to as RRC_IDLE DRX.

Thus, if DRX is configured, PDCCH monitoring/reception may be discontinuously performed in a time domain when performing the procedures and/or methods described/proposed above.

Figure 11:
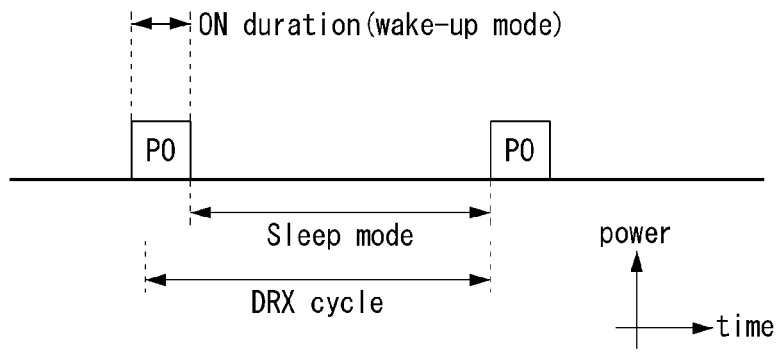
FIG. 11 illustrates a DRX cycle for paging.

FIG. 11 illustrates a DRX cycle for paging.

Referring to FIG. 11, DRX may be configured for discontinuous reception of a paging signal. A UE may receive DRX configuration information from a base station via higher layer signaling (e.g., RRC signaling). The DRX configuration information may include configuration information regarding a DRX cycle, a DRX offset, and a DRX timer. The UE repeats an on-duration and a sleep-duration depending on the DRX cycle. The UE may operate in a wakeup mode for the on-duration, and operate in a sleep mode for the sleep-duration. In the wakeup mode, the UE may monitor PO to receive a paging message. The PO refers to time resource/duration (e.g., subframe, slot) in which the UE expects to receive the paging message. The PO monitoring includes monitoring PDCCH (or MPDCCH, NPDCCH) (hereinafter, paging PDCCH) scrambled to P-RNTI in the PO. The paging message may be included in a paging PDCCH, or included in a PDSCH scheduled by paging PDCCH. One or a plurality of PO(s) is included in a paging frame (PF), and the PF may be periodically configured based on a UE ID. The PF may correspond to one radio frame, and the UE ID may be determined based on an international mobile subscriber identity (IMSI) of the UE. If the DRX is configured, the UE monitors only one PO per DRX cycle. If the UE receives a paging message that indicates changes in an ID of the UE and/or system information in the PO, the UE may perform a RACH process or receive (obtain) new system information from the base station, in order to initialize (or re-configure) connection with the base station. Thus, the UE may discontinuously perform the PO monitoring in a time domain, in order to perform the RACH process or receive (obtain) new system information from the base station for connection with the base station when performing the procedures and/or methods described/proposed above.

Figure 12:
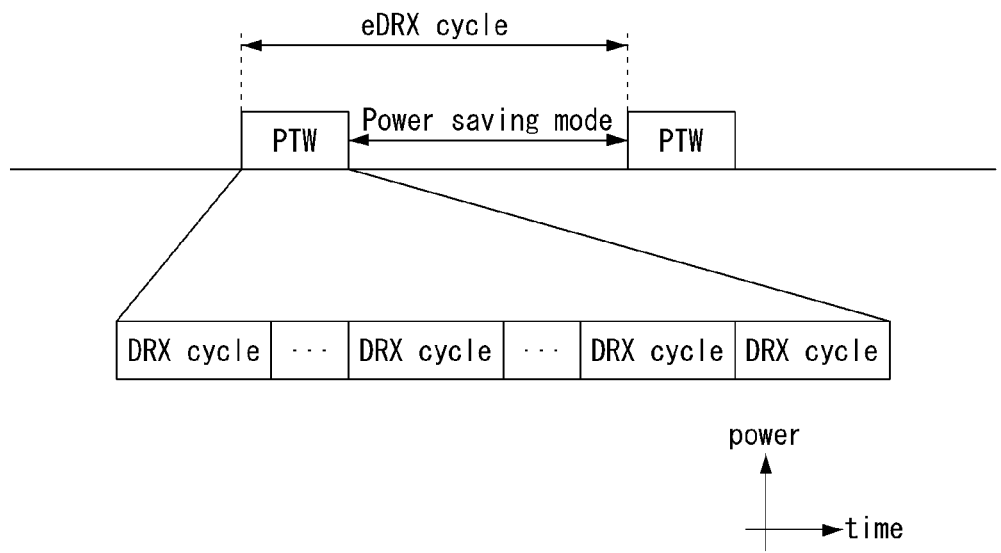
FIG. 12 illustrates an extended DRX (eDRX) cycle.

FIG. 12 illustrates an extended DRX (eDRX) cycle.

According to the configuration of the DRX cycle, a maximum cycle duration may be limited to 2.56 seconds. However, in the case of UE that intermittently performs data transmission and reception like an MTC UE or an NB-IoT UE, unnecessary power consumption may occur during a DRX cycle. In order to further reduce power consumption of the UE, a method of greatly extending the DRX cycle based on a power saving mode (PSM) and a PTW (paging time window or paging transmission window) has been introduced, and the extended DRX cycle may be abbreviated as an eDRX cycle. Specifically, a paging hyper-frame (PH) is periodically configured based on an UE ID, and the PTW is defined in the PH. The UE may perform the DRX cycle in a PTW duration and may switch to a wakeup mode in a PO of the UE to thereby monitor a paging signal. One or more DRX cycles (e.g., wakeup mode and sleep mode) of FIG. 11 may be included in the PTW duration. The number of DRX cycles in the PTW duration may be configured by the base station via higher layer (e.g., RRC) signaling.

Wake-Up Signal (WUS)

In MTC and NB-IoT, a WUS may be used to reduce power consumption related to paging monitoring. The WUS is a physical layer signal that indicates whether a UE monitors a paging signal (e.g., MPDCCH/NPDCCH scrambled to P-RNTI) depending on cell configuration. In the case of UE to which the eDRX is not configured (i.e., to which only DRX is configured), the WUS may be associated with one PO (N=1). On the other hands, in the case of UE to which the eDRX is configured, the WUS may be associated with one or more POs (N≤1). If the WUS is detected, the UE may be associated with the WUS and then may monitor N POs. On the other hands, if the WUS is not detected, the UE may maintain a sleep mode by omitting the PO monitoring until the UE monitors a next WUS.

Figure 13:
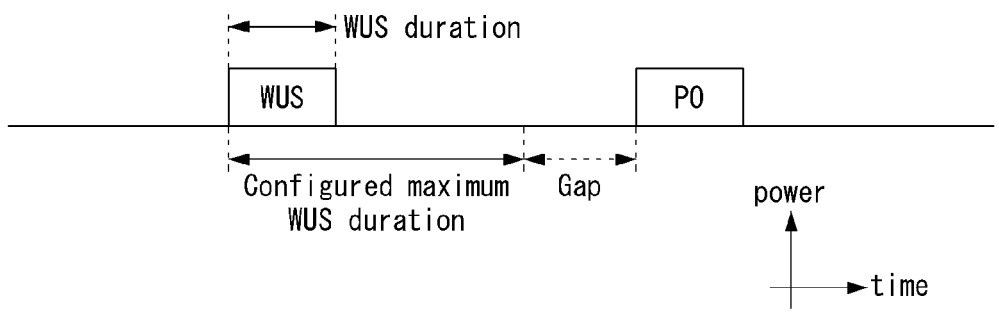
FIG. 13 illustrates a timing relationship between a WUS and a PO.

FIG. 13 illustrates a timing relationship between a WUS and a PO.

A UE may receive configuration information for a WUS from a base station and monitor the WUS based on the WUS configuration information. For example, the configuration information for the WUS may include a maximum WUS duration, the number of consecutive POs associated with the WUS, gap information, and the like. The maximum WUS duration represents a maximum time duration in which the WUS can be transmitted, and may be expressed by a rate with a maximum number of repetitions (e.g., Rmax) related to PDCCH (e.g., MPDCCH, NPDCCH). The UE may expect WUS repetitive transmission for the maximum WUS duration, but the actual number of WUS transmissions may be less than the maximum number of WUS transmissions for the maximum WUS duration. For example, the number of WUS repetitive transmissions for the UE in a good coverage may decrease. For convenience of description, a resource/occasion in which the WUS can be transmitted in the maximum WUS duration is referred to as a WUS resource. The WUS resource may be defined by a plurality of consecutive OFDM symbols and a plurality of consecutive subcarriers. The WUS resource may be defined by a plurality of consecutive OFDM symbols and a plurality of consecutive subcarriers in a subframe or a slot. For example, the WUS resource may be defined by 14 consecutive OFDM symbols and 12 consecutive subcarriers. The UE detecting the WUS does not monitor the WUS up to a first PO associated with the WUS. If the UE fails to detect the WUS for the maximum WUS duration, the UE does not monitor the paging signal in POs associated with the WUS (or the UE remains in a sleep mode).

A next-generation wireless communication system uses a wide frequency band and aims to support various services or requirements. For example, in new radio (NR) requirements of the 3GPP, Ultra Reliable and Low Latency Communication (URLLC) that is one of representative scenarios may require low latency and high reliability requirements that a user plane latency of 0.5 ms and X-byte data shall be transmitted at an error rate of $10^{-5}$ within 1 ms.

Further, traffic of URLLC is characterized in that it has a file size within tens to hundreds of bytes and occurs sporadically, unlike enhanced Mobile BroadBand (eMBB) with a large traffic capacity.

Thus, the eMBB requires transmission that maximizes a transfer rate and minimize an overhead of control information, whereas the URLLC requires a transmission method with a short scheduling time unit and the reliability.

A reference time unit assumed/used to transmit and receive a physical channel may be variously configured depending on an applied field or a type of traffic. The reference time may be a base unit for scheduling a specific physical channel. The reference time unit may vary depending on the number of symbols constituting the corresponding scheduling unit and/or a subcarrier spacing, or the like.

The present disclosure uses a slot and a mini-slot as the reference time unit, for convenience of explanation. For example, the slot used may be a scheduling base unit used in a normal data traffic (e.g., eMBB).

The mini-slot may have a shorter time duration than the slot in a time domain. The mini-slot may be a scheduling base unit used in more special purpose traffic or communication schemes (e.g., URLLC, unlicensed band or millimeter wave, etc.).

However, this is merely an example, and it is apparent that methods described in the present disclosure can be extended and applied even if the eMBB transmits and receives the physical channel based on the mini-slot, and/or even if the URLLC or other communication schemes transmit and receive the physical channel based on the slot.

Hereinafter, the present disclosure proposes methods related to blind decoding.

Specifically, the present disclosure proposes a method of decoding a PDCCH candidate of a high aggregation level or decoding a PDCCH candidate considering a service type (hereinafter, a first embodiment), a method of reporting a capability of a UE related to a blind decoding operation (hereinafter, a second embodiment), and a method of transmitting a reference signal for channel estimation regardless of PDCCH candidate (hereinafter, a third embodiment).

Hereinafter, embodiments described in the present disclosure have been merely divided for convenience of description, and some methods and/or some configurations of any embodiment can be substituted with methods and/or configurations of other embodiments or can be mutually combined and applied.

In embodiments of the present disclosure, a slot, a subframe, a frame, etc. described below may correspond to detailed examples of given time units used in a wireless communication system. That is, in applying methods described in the present disclosure, a time unit may be substituted and applied with other time units applied to other wireless communication systems.

In embodiments of the present disclosure, a monitoring occasion described below may be referred to as a monitoring span or a monitoring duration.

In embodiments of the present disclosure, the number of CCEs described below may refer to the number of non-overlapping CCEs.

First Embodiment

First, a method of decoding a PDCCH candidate of a high aggregation level or decoding a PDCCH candidate considering a service type is described in detail below.

In a next-generation system, a rule is defined to limit the number of PDCCH candidates that a UE shall attempt to blind decode per slot and the number of channel estimations that the UE shall perform for PDCCH demodulation, for the purposes of the support of various service requirements and/or flexible and efficient resource utilization, or the like.

For more reliable transmission of PDSCH, the reliability of PDCCH scheduling PDSCH also needs to be improved. To this end, a method of supporting PDCCH candidates of a higher aggregation level (AL) (e.g., AL=16) may be considered. There may occur a case where resources are insufficient to transmit PDCCH candidates corresponding to such a high AL in a specific control resource set (CORESET). If a corresponding candidate is split during a specific time duration and transmitted or skipped, scheduling latency and/or restriction may be caused.

Thus, if resources are insufficient to transmit PDCCH candidates corresponding to a specific AL (e.g., AL=16) in a specific CORESET, a rule may be defined, agreed, and/or configured, in which the UE considers as many control channel elements (CCEs) as possible as candidates and performs decoding. This may be that the UE recognizes that some of corresponding PDCCH candidates are punctured or rate-matched, and performs decoding. The above operation may be applied only to the case of a specific AL and/or a specific search space set.

And/or, a rule may be defined, agreed, and/or configured, so that the UE performs an operation of decoding such a partial candidate only when the number of CCEs corresponding to the AL of the PDCCH candidates is equal to or greater than a given portion. This reason is that it may be impossible to decode original information from the PDCCH candidates in which a very small number of CCEs remain. Information on the portion may be defined by a capability of the UE and reported to a base station. That is, it may be construed that the UE can perform decoding only when CCEs that is equal to or greater than a portion reported for PDCCH candidates of the specific AL are secured.

The base station may check whether the corresponding UE performs blind decoding for a partial candidate remaining in a specific portion using this capability information, and may transmit downlink control information (DCI). And/or, information for the portion may be pre-defined and/or may be configured by the base station via higher layer signalling.

And/or, the following operation may be considered to implement such an operation.

If the number of all CCEs of CORESET corresponding to AL=X (highest AL configured to a search space set) does not satisfy X, but satisfies alpha*X (e.g., alpha=0.8), it may be assumed that candidates mapped to all the CCEs corresponding to the entire CORESET are present. If one or more candidates are mapped to AL=X, it may be assumed that only one candidate is monitored, and it may be assumed that hashing for AL=X is not applied (i.e., starting CCE=0), or is applied and wrapped around and mapped. Assuming that the total number of CCEs is Y, the UE may operate considering that CCEs corresponding to X-Y are rate-matched.

And/or, a separate configuration may be added to a search space set configuration. If the corresponding configuration is added, this may mean that the UE additionally monitors a candidate corresponding to hashing=0 by considering that the candidate has been rate-matched with the number of available CCEs within an associated CORESET in a corresponding search space set as described above with respect to an aggregation level (AL) L that is most not smaller than the number of CCEs.

And/or, if a candidate corresponding to X is skipped for the highest AL=X due to a rate matching resource with a corresponding CORESET or a collision with an SSB, the corresponding candidate skip may greatly affect a specific service (e.g., URLLC), and thus it may be assumed that a rate matching operation instead of the candidate skip is performed on AL=X. Characteristically, the UE may apply this to a resource to be rate-matched by a semi-static and/or dynamic indication. For example, upon a rate matching resource indication of PDSCH via layer 1 (L1) signalling, a portion overlapping with the corresponding resource or a scheduled PDSCH region may be rate-matched with a control region (or control). Such an operation may be enabled and/or disabled depending on configuration. Alternatively, rather than limiting to AL=X, configuration, in which the rate matching is used for a specific search space set instead of a candidate skip, may be considered.

And/or, characteristically, such an operation may be performed only on a zero power (ZP)-channel state information (CSI)-reference signal (RS) and a non-zero power (NZP)-CSI-RS among a rate matching resource, PDSCH, and ZP-CSI-RS. Particularly, this may be useful if it is difficult to avoid the transmission of a CSI-RS and the overlap of a synchronization signal set (SS SET) when a monitoring occasion is repeated several times within one slot. The rate-matching may be performed at a resource element (RE) level or empty all CSI-RS transmission symbols. Although a control region (or Control) is rate-matched, a last OFDM symbol of specific DCI and/or PDCCH uses a last symbol of a CORESET associated with a monitored search space set as a basis.

And/or, characteristically, a PDCCH candidate to which such a rate-matching operation will be applied may be enabled and/or disabled only if it is scheduled to specific RNTI that has been pre-defined, agreed and/or configured, belongs to a specific search space set that has been pre-defined, agreed and/or configured, has a specific numerology, has a specific TTI length and/or duration, or is indicated as a specific processing time, and/or if specific CRC masking has been used. This may include a case where the PDCCH candidate has been associated with a specific service type (e.g., URLLC) or a specific reliability and/or latency requirement.

And/or, a flexible symbol window may be configured in a search space set. For example, if a CORESET with a length of 2 (CORESET duration=2) is mapped to the search space set and a monitoring occasion of the corresponding search space set is {0, 4, 8, 10} and is configured within a slot (SS set monitoring in OFDM symbols 0, 4, 8, 10), a corresponding candidate may be skipped when an overlap with PDSCH, a rate matching resource, and CSI-RS occurs for one occasion.

In order to prevent this, if overlaps occurs for the highest AL candidates (or for candidates of a set of ALs), a search space set monitoring occasion may be shifted by the number of OFDM symbols within a flexible symbol window.

For example, when a flexible symbol window is 2 OFDM symbols, this may mean that search space monitoring is shifted if the overlap can be avoided by shifting the search space monitoring within 2 symbols (i.e., OFDM symbol 5 or 6) when an SS set monitoring occasion starting at an OFDM symbol 4 overlaps a rate-matching resource (RMR) or a CSI-RS.

If another rate matching resource occurs although a shift is performed, it may be assumed that a first monitoring occasion is maintained. It may be assumed that such information is determined by only semi-static information so that the base station (or network) and a UE have the same information. If candidates are multiple when a corresponding method is used, a shift operation may be assumed only if all candidates for a specific AL (or AL set) are skipped. In a similar method, it may be assumed that a search space is configured with a shorter period and a monitoring skip is performed on all search spaces that are not monitored because a candidate of a specific AL or AL set is skipped.

If corresponding monitoring is skipped, it may be assumed that BD and/or a channel estimation budget is not allocated to a corresponding occasion. In general, if an AL (or AL set) to be protected for each search space set is configured and all candidates for the corresponding AL are skipped, the entire corresponding search space set may be skipped in a corresponding occasion.

And/or, when a corresponding method is used, a method of calculating the number of CCEs in the CORESET may be as follows.

The number of CCEs may be measured based on the number of RBs and the number of REGs according to CORESET configuration regardless of the rate matching resource or a collision with the SSB. When a corresponding method is used, actually available resources may be less than the number of CCEs if REGs that are not actually used due to the rate matching resource or the collision with the SSB is excluded. The corresponding operation may be an operation different from an operation that the UE performs for other AL (i.e., candidate skip where the candidate overlaps partially or fully with rate matching resource and/or SSB).

And/or, all the CCEs may be calculated except all the rate matching resource, REGs or CCEs that collide against the SSB. If rate matching is performed on a CSI-RS, the corresponding overlap may not be considered.

And/or, if a service type and/or service requirement are determined by a search space, higher priority may be given to a search space set associated with lower latency and/or higher reliability. A rule may be defined, agreed and/or configured to preferentially perform blind decoding for a candidate belonging to a corresponding search space set.

And/or, if a service type and/or service requirements are determined by an RNTI, an RNTI that needs to be monitored for each search space may be pre-defined and/or configured, and higher priority may be given to a search space to which an RNTI associated with lower latency and/or higher reliability belongs. A rule may be defined, agreed and/or configured to preferentially perform blind decoding for a candidate belonging to the corresponding search space set.

Second Embodiment

Next, a method of reporting a UE capability related to a blind decoding operation is described in detail.

In particular, the second embodiment is described by being divided into a method of reporting a UE capability related to blind decoding (hereinafter, method 1), a method of separately defining a UE capability based on a service type (hereinafter, method 2), a method of defining a UE capability as a different value based on a UE capability related to a PDSCH processing time (hereinafter, method 3), a method of defining a UE capability as a different value based on characteristics of a downlink/uplink data channel (hereinafter, method 4), and a method of defining a transmission timing gap as a different value based on a UE capability related to blind decoding (hereinafter, method 5).

The methods described below are merely divided for convenience of description, and configuration of any method can be substituted with configuration of other method or they can be mutually combined and applied.

(Method 1)

First, a method of reporting a UE capability related to blind decoding is described in detail.

If traffic that needs to satisfy a URLLC service or lower latency requirement has to be processed, more frequent scheduling may need to be performed using a channel with a shorter duration. In this case, a monitoring occasion within a slot may need to be split in pieces. In such a situation, a blind decoding (BD) limit of a UE that has been currently defined may be insufficient, and a capability capable of performing a larger number of blind decodings in order to support the services and/or requirements may be defined, agreed and/or configured as a UE capability. In the present disclosure, a monitoring occasion may be referred to as a monitoring span or monitoring duration.

Characteristically, a rule may be defined, agreed and/or configured, so that a UE reports a maximum number of PDCCH candidates capable of being monitored within one monitoring occasion. Such a capability may be separately defined and reported per the number (and/or group) of monitoring occasions within a slot if a set of the number of monitoring occasions within a slot is fixed. In general, information about a maximum number of PDCCH candidates capable of being monitored for a given time duration, a maximum number of corresponding time durations within a slot, and/or a minimum gap between time durations may be reported as the UE capability.

And/or, information about a maximum number of monitoring occasions within a slot, a minimum gap between monitoring occasions, and/or a maximum number of PDCCH candidates that the UE can monitor within one monitoring occasion per numerology may be reported as a UE capability.

And/or, information about a maximum number of CCEs which is capable of channel estimation (CE) for a given time duration (e.g., monitoring occasion), a maximum number of corresponding time durations within a slot, and/or a minimum gap between time durations may be reported as a UE capability. In the present disclosure, the number of CCEs may mean the number of non-overlapping CCEs.

And/or, information about a maximum number of monitoring occasions within a slot, a length of a monitoring occasion, a gap (e.g., minimum gap) between monitoring occasions, and/or a maximum number of CCEs that the UE can channel-estimate per numerology may be reported as a UE capability. In other words, information on a maximum number of non-overlapped CCEs which can be channel-estimated per monitoring occasion may be reported as a UE capability per at least one of the length of the monitoring occasion, a gap between monitoring occasions, and/or numerology.

And/or, a maximum number of BDs and/or CEs supportable in one monitoring occasion is the same as the number that has been currently defined in eMBB (e.g., the number at 15 kHz is 44/56), and based on this, a rule may be defined, agreed and/or configured so that a maximum number of BDs and/or CEs which can be supported by the UE within a specific time duration (e.g., 1 ms) is determined (e.g., 8 times the corresponding number).

As a characteristic example, if a maximum number of monitoring occasions within a slot is 7 (when a minimum gap is 2 symbols), a BD limit may be 20 and a CE limit may be 40 (BD limit=20 and CE limit=40), whereas if a maximum number of monitoring occasions within a slot is 2 (when a minimum gap is 7 symbols), a BD limit may be 44 and a CE limit may be 56 (BD limit=44 and CE limit=56). That is, a rule may be defined and/or configured, so that the BD limit and/or the CE limit tend to decrease as a minimum gap between monitoring occasions decreases.

A base station may configure a monitoring occasion using the above information, so that the monitoring occasion does not exceed a capability of the corresponding UE. A rule may be defined, agreed and/or configured, so that the UE skips monitoring for a monitoring occasion, a candidate and/or an AL (and/or set) with low priority based on a pre-defined priority (or so that the UE does not expect a configuration exceeding its own capability) when the monitoring occasion exceeds the capability of the corresponding UE.

(Method 2)

Next, a method of separately defining a UE capability related to blind decoding based on a service type is described.

When a capability is defined as described above (e.g., when information about a maximum number of PDCCH candidates capable of being monitored for a given time duration, a maximum number of non-overlapped CCEs, a maximum number of corresponding time durations within a slot, a minimum gap between time durations, and/or a length of the time duration is defined as a UE capability), the corresponding capability may be separately defined, agreed and/or configured per target service (e.g., URLLC), quality of service (QoS), BLER requirements, reliability requirements, latency requirements, and/or processing time.

And/or, the corresponding capability may be separately defined, agreed and/or configured per search space (type), RNTI, CORESET, DCI format (group), DCI size, and/or aggregation level (AL). For example, for search spaces (and/or types) which may be classified into a plurality of groups, the PDCCH monitoring capability may be separately defined, agreed and/or configured for each group.

And/or, if a maximum number of PDCCH candidates capable of being monitored per slot and/or a maximum number of non-overlapped CCEs are defined as X and the number of time durations within a slot is {Y1, Y2, . . . , Yn}, X may be defined, agreed and/or configured as a minimum common multiple of {Y1, Y2, . . . , Yn}. Furthermore, if the number of time durations within a slot is Yk, X/Yk may be defined, agreed and/or configured as a maximum number of PDCCH candidates capable of being monitored in the corresponding time duration and/or a maximum number of non-overlapped control channel elements (CCEs).

In general, if a maximum number of PDCCH candidates capable of being monitored per slot and/or a maximum number of non-overlapped CCEs are defined as X and the number of time durations within a slot is {Y1, Y2, . . . , Yn}, a maximum number of PDCCH candidates capable of being monitored in the corresponding time duration and/or a maximum number of non-overlapped CCEs for the number Yk of specific time durations within a slot may be defined, agreed and/or configured as the greatest integer (i.e., floor {X/Yk}) smaller than X/Yk.

A base station may configure a monitoring occasion, the number of candidates, CORESET, and/or a search space using the above information, so that they do not exceed a capability of the corresponding UE. A rule may be defined, agreed and/or configured, so that the UE skips monitoring for a monitoring occasion, a candidate, an AL, and/or a search space (and/or set) with low priority based on a pre-defined priority (or so that the UE does not expect a configuration exceeding its own capability) when they exceed the capability of the corresponding UE.

(Method 3)

Next, a method of defining a UE capability related to blind decoding as a different value based on a UE capability related to a PDSCH processing time is described.

And/or, after PDCCH decoding is terminated, based on this, a UE performs a necessary operation among PDSCH decoding, HARQ-ACK encoding, and PUSCH encoding. In this case, if a maximum number of PDCCH candidates to be monitored by the UE within a specific time and/or a maximum number of non-overlapped CCEs increase, a time margin necessary for operations that need to be subsequently performed may be reduced due to PDCCH monitoring.

Thus, if a capability is defined as described above (e.g., information about a maximum number of PDCCH candidates which can be monitored for a given time duration, a maximum number of non-overlapped control channel elements (CCEs), a maximum number of corresponding time durations within a slot, a minimum gap between time durations, and/or a length of the time duration is defined as a UE capability), the corresponding capability may be defined, agreed and/or configured (independently) as a different value based on a UE capability (e.g., UE PDSCH processing procedure time and/or UE PUSCH preparation procedure time) for a scheduling timing gap (PDCCH-to-PDSCH timing gap, PDCCH-to-PUSCH timing gap, and/or a PDSCH-to-PUCCH timing gap) and/or a configuration of a base station for the scheduling timing gap. The PDCCH-to-PDSCH timing gap may mean a timing gap (e.g., k0) from a reception time of PDCCH to a reception time of a PDSCH scheduled by the corresponding PDCCH. For example, the PDSCH-to-PUCCH timing gap may mean a timing gap (e.g., k1) from a reception time of PDSCH to a transmission time of PUCCH including HARQ-ACK information for the corresponding PDSCH.

For example, if values of the UE capability for the PDSCH-to-PUCCH timing gap are defined as 8 symbols and 3 symbols, respectively, values of the UE capability for a maximum number of PDCCH candidates capable of being monitored within a slot for a specific time duration and/or a maximum number of non-overlapped CCEs may be defined, agreed and/or configured as X and Y (e.g., X>Y), respectively.

And/or, the UE capability (e.g., UE PDSCH processing procedure time and/or UE PUSCH preparation procedure time) for the PDCCH-to-PUSCH timing gap and/or the PDSCH-to-PUCCH timing gap and/or configuration (e.g., minimum value of scheduling timing gap) of a base station for the scheduling timing gap may be defined, agreed and/or configured (independently) as a different value based on the PDCCH monitoring capability (e.g., a maximum number of PDCCH candidates capable of being monitored within a slot for a specific time duration and/or a maximum number of non-overlapped CCEs).

For example, if the PDCCH candidates need to be monitored 44 times in one slot, and if the PDCCH candidates need to be monitored 44 times in one half slot (i.e., time duration corresponding to half of a slot), values of the UE capability for the PDSCH-to-PUCCH timing gap may be defined, agreed and/or configured as X symbols and Y symbols (e.g., X<Y or Y=X+alpha and alpha>0), respectively.

For another example, if the PDCCH candidates need to be monitored 44 times in one slot, and if the PDCCH candidates need to be monitored 44 times per monitoring occasion when a minimum gap between two consecutive PDCCH transmissions within a slot is 2 symbols, values of the UE capability for the PDSCH-to-PUCCH timing gap may be defined, agreed and/or configured as X symbols and Y symbols (e.g., X<Y or Y=X+alpha and alpha>0), respectively.

And/or, if the UE capability (e.g., UE PDSCH processing procedure time and/or UE PUSCH preparation procedure time) for the PDCCH-to-PUSCH timing gap and/or the PDSCH-to-PUCCH timing gap is equal to or less than a specific value, the PDCCH monitoring capability (e.g., a maximum number of PDCCH candidates capable of being monitored within a slot for a specific time duration and/or a maximum number of non-overlapped CCEs) may not be applied, and a maximum number of PDCCH candidates capable of being monitored during the existing slot and/or a maximum number of non-overlapped CCEs may be applied.

And/or, if the PDCCH monitoring capability (e.g., a maximum number of PDCCH candidates capable of being monitored within a slot for a specific time duration, a maximum number of non-overlapped CCEs, a maximum number of corresponding time durations within a slot, a minimum gap between time durations, and/or a length of a time duration) is equal to or greater than a predetermined level, the UE capability (e.g., UE PDSCH processing procedure time and/or UE PUSCH preparation procedure time) for the PDCCH-to-PUSCH timing gap and/or the PDSCH-to-PUCCH timing gap may be applied as a processing capability 1.

The base station may configure a monitoring occasion, the number of candidates, CORESET, and/or a search space using the above information, so that they do not exceed a capability of the corresponding UE. A rule may be defined, agreed and/or configured, so that the UE skips monitoring for a monitoring occasion, a candidate, an AL, and/or a search space (set) with low priority based on a pre-defined priority (or so that the UE does not expect a configuration exceeding its own capability) when they exceed the capability of the corresponding UE.

(Method 4)

Next, a method of defining a UE capability related to blind decoding as a different value based on characteristics of a downlink/uplink data channel is described.

If a capability is defined as described above (e.g., information about a maximum number of PDCCH candidates capable of being monitored for a given time duration, a maximum number of non-overlapped CCEs, a maximum number of corresponding time durations within a slot, a minimum gap between time durations, and/or a length of the time duration is defined as a UE capability), the corresponding capability may be separately defined, agreed and/or configured (independently) as a different value based on a transport block size, the number of layers, and/or the number of RBs of downlink and/or uplink data channel (DL/UL data channel).

And/or, upper and lower limits of the transport block size, the number of layers, and the number of RBs of the downlink and/or uplink data channel may be defined, agreed and/or configured (independently) as a different value based on the PDCCH monitoring capability (e.g., a maximum number of PDCCH candidates capable of being monitored within a slot for a specific time duration, a maximum number of non-overlapped CCEs, a maximum number of corresponding time durations within a slot, a minimum gap between time durations, and/or a length of a time duration).

And/or, if the transport block size, the number of layers, and the number of RBs of the downlink and/or uplink data channel are equal to or greater than a specific value, the PDCCH monitoring capability (e.g., a maximum number of PDCCH candidates capable of being monitored within a slot for a specific time duration, a maximum number of non-overlapped CCEs, a maximum number of corresponding time durations within a slot, a minimum gap between time durations, and/or a length of a time duration) may not be applied, and a maximum number of PDCCH candidates which can be monitored during the existing slot and/or a maximum number of non-overlapped CCEs may be applied.

A base station may configure a monitoring occasion, the number of candidates, CORESET, and/or a search space using the above information, so that they do not exceed a capability of the corresponding UE. A rule may be defined, agreed and/or configured, so that the UE skips monitoring for a monitoring occasion, a candidate, an AL, and/or a search space (set) with low priority based on a pre-defined priority (or so that the UE does not expect a configuration exceeding its own capability) when they exceed the capability of the corresponding UE.

And/or, characteristically, a restriction on the transport block size, the number of layers, and/or the number of RBs of the downlink and/or uplink data channel may be defined and/or applied to only a specific monitoring occasion, span and/or time duration.

And/or, a restriction on the transport block size, the number of layers, and/or the number of RBs of the downlink and/or uplink data channel may be independently (differently) defined and/or applied per monitoring occasion, span and/or time duration.

This may be to prevent an excessive increase in processing complexity of the UE by also defining a scheduling restriction in a monitoring occasion, span and/or time duration, in which a maximum number of PDCCH candidates and/or a maximum number of non-overlapped CCEs having greater values are defined, considering that a maximum number of PDCCH candidates and/or a maximum number of non-overlapped CCEs having different values can be defined per monitoring occasion, span and/or time duration within a slot.

For example, a maximum number of PDCCH candidates and/or a maximum number of non-overlapped CCEs in a first monitoring occasion and/or span within a slot may be defined to have a greater value than that in remaining monitoring occasions and/or spans. A restriction on the upper limit of the transport block size, the number of layers, and/or the number of RBs of the downlink and/or uplink data channel may be defined for only the first monitoring occasion and/or span. In this case, the UE may expect that a downlink and/or uplink data channel corresponding to a transport block size, the number of layers, and/or the number of RBs not exceeding the restriction is scheduled in the first monitoring occasion and/or span.

For another example, the upper limit of the transport block size, the number of layers, and/or the number of RBs of the downlink and/or uplink data channel having different values may be defined between the first monitoring occasion and/or span and the remaining monitoring occasions and/or spans. In this case, the UE may expect that a downlink and/or uplink data channel is scheduled in each monitoring occasion and/or span not to exceed the upper limit of the transport block size, the number of layers, and/or the number of RBs that are defined, respectively.
(Method 5)

Next, a method of defining a transmission timing gap as a different value based on a UE capability related to blind decoding is described.

A value (e.g., minimum value of a scheduling timing gap) of a PDCCH-to-PDSCH timing gap which may be configured and/or indicated by a base station may be defined (independently) as a different value (and/or may be reported to the base station as a UE capability) based on the PDCCH monitoring capability (e.g., a maximum number of PDCCH candidates and/or a maximum number of non-overlapped CCEs which can be monitored for a specific time duration within a slot).

For example, a rule may be defined, agreed and/or configured, such that a first symbol of a PDSCH is scheduled so that it is not ahead of a last symbol of the PDCCH when the PDCCH candidates need to be monitored 44 times in one slot, and so that the PDSCH can start from after a predetermined time has passed from the last symbol of the PDCCH when the PDCCH candidates need to be monitored 44 times in one half slot (i.e., time duration corresponding to half of a slot). Even in this case, after PDCCH decoding is terminated, based on this, a UE sequentially performs a necessary operation among PDSCH decoding, HARQ-ACK encoding, and PUSCH encoding. This may consider that a time margin necessary for operations that need to be subsequently performed may be reduced due to PDCCH monitoring if a maximum number of PDCCH candidates and/or a maximum number of non-overlapped CCEs, that the UE shall monitor within a specific time, increase.

A base station may configure a monitoring occasion, the number of candidates, CORESET, and/or a search space based on the rule and/or information obtained from the UE so that they do not exceed a capability of the corresponding UE, and may determine a PDCCH-to-PDSCH timing gap to a limit that can be processed by the UE. A rule may be defined, agreed and/or configured, so that the UE skips monitoring for a monitoring occasion, a candidate, an AL, and/or a search space (set) with low priority based on a pre-defined priority (or so that the UE does not expect a configuration exceeding its own capability) when they exceed the capability of the corresponding UE.

In the present disclosure, a target service (e.g., URLLC), QoS, BLER requirement, reliability requirement, latency requirement and/or a processing time for a specific channel may be configured via high layer signal, may be explicitly indicated via a specific field of DCI, may be distinguished through a search space to which a PDCCH (scheduling downlink and/or uplink data (DL/UL data)) belongs, may be distinguished through a control resource set (CORESET) to which a PDCCH (scheduling downlink and/or uplink data) belongs, may be distinguished by RNTI, may be distinguished by a DCI format, and/or may be distinguished through the CRC masking of the PDCCH.

The proposals of the present disclosure can also be applied to the handling of a plurality of types of channels distinguished by a specific field of DCI, a search space to which PDCCH belongs, CORESET to which PDCCH belongs, RNTI, a DCI format and/or the CRC masking of PDCCH, etc. without explicit distinction for a target service, QoS, BLER requirement, reliability requirement, latency requirement and/or a processing time for a channel. In the proposals of the present disclosure, "a channel corresponding to a specific target service, QoS, BLER requirement, reliability requirement, latency requirement and/or processing time" may be substituted and applied as "a specific channel distinguished by a specific field of DCI, a search space to which PDCCH belongs, CORESET to which PDCCH belongs, RNTI, a DCI format and/or CRC masking of PDCCH among a plurality of types of channels."

It is evident that examples of the above-described proposed methods can also be considered as a kind of proposed methods since they can be included in implementation methods of the present disclosure. Furthermore, the above-described proposed methods may be independently implemented, and may be implemented in the form of a combination (or merge) of some of the proposed methods. A rule may be defined, agreed and/or configured so that the base station informs the UE of information about whether to apply the proposed methods (or information on the rules of the proposed methods) via a pre-defined signal (e.g., physical layer signal or higher layer signal).

Third Embodiment

Next, a method of transmitting a reference signal for channel estimation regardless of PDCCH candidates is described in detail.

In PDCCH of LTE, aggregation levels (ALs), that needs to perform monitoring in each subframe, and/or the number of candidates for each AL are fixed, and thus a UE performs blind decoding for the same number of candidates in each subframe. Further, because the PDCCH uses CRS, if the UE performs channel estimation for a system bandwidth once using DFT based channel estimation, the UE was able to derive a result of channel estimation for each RE of a PDCCH region. Even in the case of EPDCCH, because the total number of RBs is limited, the number of necessary channel estimations is limited.

In an NR control channel, a DMRS may be used, a search space set may be defined, and the ALs included in the corresponding search space set and the number of candidates for each AL may be configured in each search space set. In addition, monitoring periodicity that needs to monitor the corresponding search space set may be configured in each search space set. The channel estimation in the NR control channel has properties in which it increases according to a bandwidth (BW) of configuration of CORESET and a time duration, and the BW of CORESET is not entirely limited.

Thus, considering a distribution and an REG bundle of search space candidates and a hashing function between the ALs, it is characterized in that channel estimation complexity is variously distributed. If the UE performs blind decoding for a large number of candidates for a specific time unit, resource utilization can increase from a base station (or network) perspective. Therefore, scheduling flexibility can increase. However, since the UE shall perform PDSCH and HARQ processes scheduled by the control channel from the UE perspective, complexity increase and delay propagation due to the complexity increase may occur.

Accordingly, in order to reduce a burden on the complexity increase of the UE in performing the above-described channel estimation, a rule may be defined, agreed and/or configured so that a specific reference signal (e.g., PDCCH DMRS, TRS) is transmitted regardless of whether to transmit actual PDCCH candidates.

In the present disclosure, the reference signal may be referred to as an always-on DMRS for convenience of description. The always-on DMRS may be transmitted for demodulation of PDCCH candidates for a given time duration (e.g., slot) that is pre-defined (or configured via higher layer signal), and a rule may be defined, agreed and/or configured so that the always-on DMRS is transmitted from the first symbol(s) of CORESET for a corresponding time duration. That is, the DMRS is not transmitted for every PDCCH candidate, a reference signal is transmitted only to the some first symbols of the CORESET, and channel estimation for demodulation of all the PDCCH candidates of the CORESET is performed on only the corresponding always-on DMRS, thereby reducing the number of channel estimations the UE. Time domain information (e.g., OFDM symbol), on which the always-on DMRS will be transmitted, may be pre-defined (e.g., a first symbol or the first two symbols in CORESET) and/or configured via the higher layer signal.

And/or, the always-on DMRS may be transmitted along the same pattern as a DM-RS pattern transmitted on the PDSCH, and the entire PDSCH region (for determining the DM-RS pattern) may assume and operate from a first symbol of a first search space set monitoring occasion to a last symbol of a last occasion on each slot. The corresponding signal may assume to be present in a frequency domain of the mapped CORESET for the time duration.

And/or, whether to apply the always-on DMRS may be configured per search space set. A rule may be defined, agreed and/or configured so that for PDCCH candidates in a search space that is configured to apply the always-on DMRS, the UE performs decoding on the assumption that an individual DMRS is not transmitted, and on the other hand, for PDCCH candidates in a search space that is configured not to apply the always-on DMRS, the UE performs decoding on the assumption that the DMRS is transmitted for each PDCCH candidate.

And/or, whether to apply the always-on DMRS may be configured per CORESET. In this case, whether to transmit the always-on DMRS may be determined at once for all the search spaces associated with the corresponding CORESET, and hence the UE may determine whether the DMRS is present in the PDCCH candidates.

And/or, time window information about an application range of the always-on DMRS may be pre-defined on a per time basis (e.g., slot and/or symbol), and/or may be configured via higher layer signalling.

And/or, characteristically, the application range of the always-on DMRS may be extended to a plurality of CORESETs. For example, if a time window about the application range of the always-on DMRS is configured with symbols #0 to #6, the always-on DMRS may be used for all the PDCCH candidates of all the CORESETs in the symbols #0 to #6 and thus may be used for the channel estimation and demodulation. On the other hand, on a CORESET with a lowest CORESET ID and/or a first symbol of the CORESET for CORESETs after a symbol #7, the always-on DMRS is transmitted to the earliest CORESET, and the corresponding DMRS may use the always-on DMRS for PDCCH candidates of all the CORESETs within symbols #7 to #13 and may use it for the channel estimation and/or demodulation.

And/or, characteristically, the always-on DMRS may be transmitted over all frequency bands configured to the CORESET, may be transmitted over the corresponding frequency band by configuring one of patterns pre-defined via higher layer signal, and/or may be transmitted over a frequency band indicated via physical layer signal.

And/or, the always-on DMRS may be applied only to the PDCCH candidates with a specific AL. For the PDCCH candidates of the AL that is not applied, an individual DMRS may be transmitted within the PDCCH candidates.

And/or, a rule may be defined, agreed, and/or configured so that the UE assumes the same Quasi Co-Location (QCL) between search spaces corresponding to an application range of a specific always-on DMRS.

It is evident that examples of the above-described proposed methods can also be considered as a kind of proposed methods since they can be included in implementation methods of the present disclosure. Furthermore, the above-described proposed methods may be independently implemented, and may be implemented in the form of a combination (or merge) of some of the proposed methods. A rule may be defined, agreed and/or configured so that the base station informs the UE of information about whether to apply the proposed methods (or information on the rules of the proposed methods) via a pre-defined signal (e.g., physical layer signal or higher layer signal).

Figure 14:
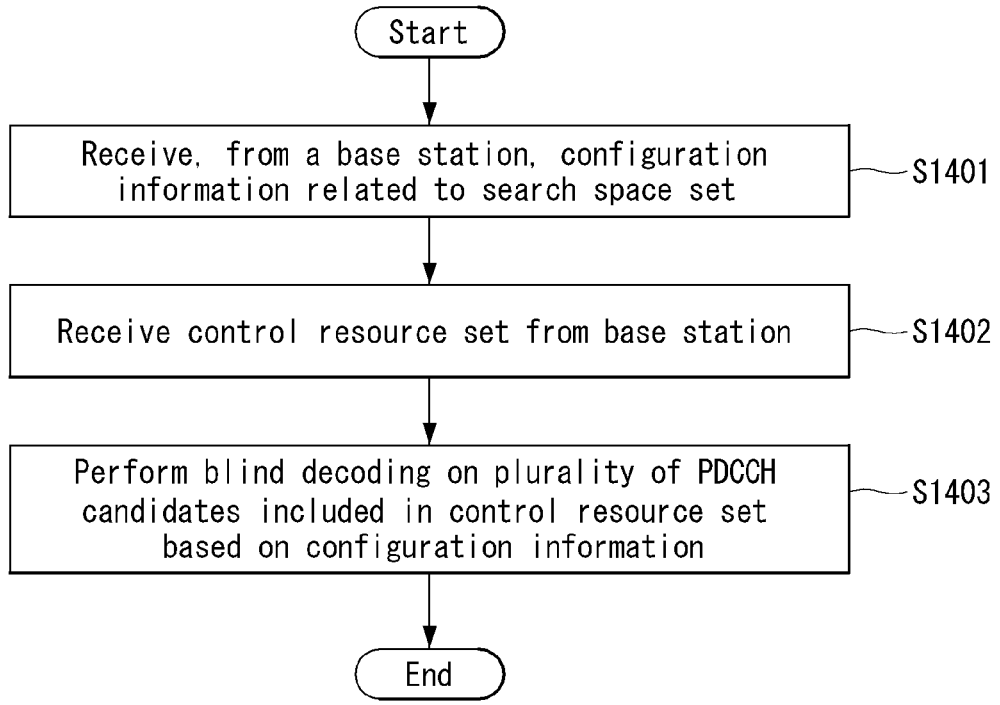
FIG. 14 is a flow chart illustrating an operation method of a UE described in the present disclosure.

FIG. 14 is a flow chart illustrating an operation method of a UE described in the present disclosure.

Referring to FIG. 14, first, a UE may receive, from a base station, configuration information related to a search space set in S1401. The configuration information may include information on the search space set.

For example, the configuration information may be a higher layer parameter SearchSpace.

The UE may perform a blind decoding in the search space set. The search space set may be Type0-PDCCH CSS set, Type0-PDCCH CSS set, Type1-PDCCH CSS set, Type2-PDCCH CSS set, and/or USS set.

Next, the UE may receive a control resource set from the base station in S1402. The control resource set may consist of a plurality of resource blocks in a frequency domain, and may consist of 1, 2, or 3 symbols in a time domain. The control resource set may include a plurality of physical downlink control channel (PDCCH) candidates. The control resource set may be associated with the search space set.

Next, the UE may perform the blind decoding for the plurality of PDCCH candidates included in the control resource set based on the configuration information in S1403.

The UE may perform the blind decoding for the plurality of PDCCH candidates included in the control resource set in the search space set.

A demodulation reference signal (DMRS) may be received per control resource set and may be used in channel estimation for demodulation of the plurality of PDCCH candidates. For example, the demodulation reference signal may be received on a first symbol or a first symbol and a second symbol of the control resource set. That is, the demodulation reference signal may be received on the first symbol of the control resource set, and may be used in the channel estimation for demodulation of all the PDCCH candidates included in the control resource set. Hence, the present disclosure can reduce the number of channel estimations.

And/or, time domain information in which the demodulation reference signal is received may be pre-defined, or may be received from the base station via higher layer signal. And/or, the demodulation reference signal may be transmitted from the base station in the same pattern as a demodulation reference signal pattern of a physical downlink shared channel (PDSCH).

And/or, whether to apply the demodulation reference signal may be configured on a per search space set basis, on a per control resource set basis, or on a per specific time basis. For example, the UE may also receive an individual demodulation reference signal. The individual demodulation reference signal may be received per PDCCH candidate, and may mean a demodulation reference signal used in channel estimation for demodulation of each PDCCH candidate. In this instance, the UE may be configured, from the base station, with whether to use the demodulation reference signal or the individual demodulation reference signal on a per search space set basis, on a per control resource set basis, or on a per specific time basis.

For example, if whether to apply the demodulation reference signal is configured on a per search space set basis, the UE may perform decoding on the assumption that the individual demodulation reference signal is not transmitted to the PDCCH candidates in the search space set that is configured to apply the demodulation reference signal, and may perform decoding on the assumption that the individual demodulation reference signal is transmitted to the PDCCH candidates in the search space set that is configured not to apply the demodulation reference signal. And/or, the UE may assume the same quasi co-location (QCL) between the search space sets to which the demodulation reference signal is applied.

For another example, if whether to apply the demodulation reference signal is configured on a per control resource set basis, the UE may perform the channel estimation on all the PDCCH candidates in the control resource set, that is configured to apply the demodulation reference signal, using the demodulation reference signal, and may perform the channel estimation on each of the PDCCH candidates in the control resource set, that is configured to apply the individual demodulation reference signal, using the individual demodulation reference signal.

For another example, if whether to apply the demodulation reference signal is configured on a per specific time basis, the UE may perform the channel estimation on the PDCCH candidates included in each control resource set using the demodulation reference signal of each control resource set included in a specific time unit that is configured to apply the demodulation reference signal, and may perform the channel estimation on the PDCCH candidates included in a specific time unit, that is configured not to apply the demodulation reference signal, using each individual demodulation reference signal. The specific time unit may be pre-defined, or received from the base station via higher layer signal. The specific time unit may be one or more symbols, one or more mini-slots, one or more slots, one or more subframes, or a combination thereof.

And/or, the plurality of PDCCH candidates may be PDCCH candidates of a specific aggregation level. For example, the demodulation reference signal may be used in the channel estimation for demodulation of PDCCH candidates of aggregation level 4 among the PDCCH candidates included in the control resource set.

And/or, the demodulation reference signal may be transmitted over all frequency bands or a specific frequency band of the control resource set. And/or, the demodulation reference signal may be transmitted over all frequency bands or a specific frequency band in a specific pattern.

Since the operation method of the UE described with reference to FIG. 14 is the same as the operation method of the UE described with reference to FIGS. 1 to 13, a further description thereof is omitted.

Figure 16:
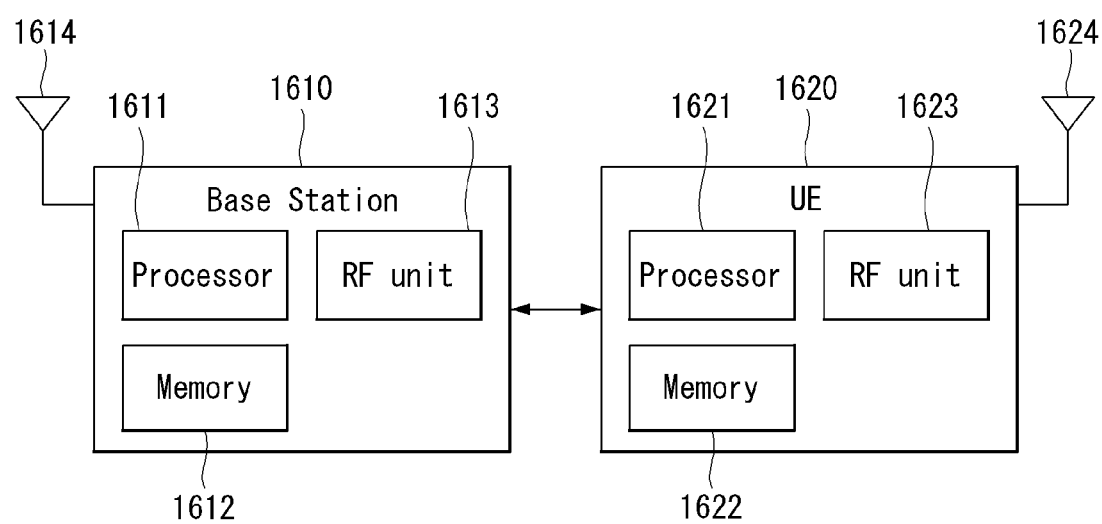
FIG. 16 illustrates a block configuration diagram of a wireless communication device to which methods described in the present disclosure are applicable.

With regard to this, the above-described operation of the UE can be implemented in detail by a UE 1620 illustrated in FIG. 16. For example, the above-described operation of the UE can be performed by a processor 1621 and/or an RF unit 1623.

Referring to FIG. 16, first, the processor 1621 may receive, from a base station, configuration information related to a search space set through the RF unit 1623, in S1401. The configuration information may include information on the search space set.

For example, the configuration information may be a higher layer parameter SearchSpace.

The UE may perform a blind decoding in the search space set. The search space set may be Type0-PDCCH CSS set, Type0-PDCCH CSS set, Type1-PDCCH CSS set, Type2-PDCCH CSS set, and/or USS set.

Next, the processor 1621 may receive a control resource set from the base station through the RF unit 1623 in S1402. The control resource set may consist of a plurality of resource blocks in a frequency domain, and may consist of 1, 2, or 3 symbols in a time domain. The control resource set may include a plurality of physical downlink control channel (PDCCH) candidates. The control resource set may be associated with the search space set.

Next, the processor 1621 may perform the blind decoding for the plurality of PDCCH candidates included in the control resource set based on the configuration information through the RF unit 1623, in S1403.

The UE may perform the blind decoding for the plurality of PDCCH candidates included in the control resource set in the search space set.

A demodulation reference signal (DMRS) may be received per control resource set and may be used in channel estimation for demodulation of the plurality of PDCCH candidates. For example, the demodulation reference signal may be received on a first symbol or a first symbol and a second symbol of the control resource set. That is, the demodulation reference signal may be received on the first symbol of the control resource set, and may be used in the channel estimation for demodulation of all the PDCCH candidates included in the control resource set. Hence, the present disclosure can reduce the number of channel estimations.

And/or, time domain information in which the demodulation reference signal is received may be pre-defined, or may be received from the base station via higher layer signal. And/or, the demodulation reference signal may be transmitted from the base station in the same pattern as a demodulation reference signal pattern of a physical downlink shared channel (PDSCH).

And/or, whether to apply the demodulation reference signal may be configured on a per search space set basis, on a per control resource set basis, or on a per specific time basis. For example, the UE may also receive an individual demodulation reference signal. The individual demodulation reference signal may be received per PDCCH candidate, and may mean a demodulation reference signal used in channel estimation for demodulation of each PDCCH candidate. In this instance, the UE may be configured, from the base station, with whether to use the demodulation reference signal or the individual demodulation reference signal on a per search space set basis, on a per control resource set basis, or on a per specific time basis.

For example, if whether to apply the demodulation reference signal is configured on a per search space set basis, the UE may perform decoding on the assumption that the individual demodulation reference signal is not transmitted to the PDCCH candidates in the search space set that is configured to apply the demodulation reference signal, and may perform decoding on the assumption that the individual demodulation reference signal is transmitted to the PDCCH candidates in the search space set that is configured not to apply the demodulation reference signal. And/or, the UE may assume the same quasi co-location (QCL) between the search space sets to which the demodulation reference signal is applied.

For another example, if whether to apply the demodulation reference signal is configured on a per control resource set basis, the UE may perform the channel estimation on all the PDCCH candidates in the control resource set, that is configured to apply the demodulation reference signal, using the demodulation reference signal, and may perform the channel estimation on each of the PDCCH candidates in the control resource set, that is configured to apply the individual demodulation reference signal, using the individual demodulation reference signal.

For another example, if whether to apply the demodulation reference signal is configured on a per specific time basis, the UE may perform the channel estimation on the PDCCH candidates included in each control resource set using the demodulation reference signal of each control resource set included in a specific time unit that is configured to apply the demodulation reference signal, and may perform the channel estimation on the PDCCH candidates included in a specific time unit, that is configured not to apply the demodulation reference signal, using each individual demodulation reference signal. The specific time unit may be pre-defined, or received from the base station via higher layer signal. The specific time unit may be one or more symbols, one or more mini-slots, one or more slots, one or more subframes, or a combination thereof.

And/or, the plurality of PDCCH candidates may be PDCCH candidates of a specific aggregation level. For example, the demodulation reference signal may be used in the channel estimation for demodulation of PDCCH candidates of aggregation level 4 among the PDCCH candidates included in the control resource set.

And/or, the demodulation reference signal may be transmitted over all frequency bands or a specific frequency band of the control resource set. And/or, the demodulation reference signal may be transmitted over all frequency bands or a specific frequency band in a specific pattern.

Since the operation of the UE described with reference to FIG. 16 is the same as the operation of the UE described with reference to FIGS. 1 to 14, a further description thereof is omitted.

Figure 15:
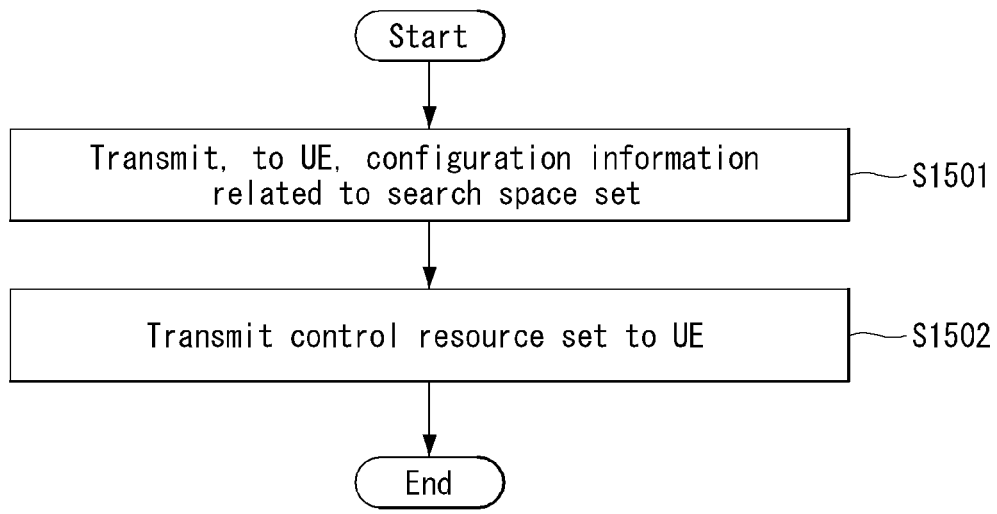
FIG. 15 is a flow chart illustrating an operation method of a base station described in the present disclosure.

FIG. 15 is a flow chart illustrating an operation method of a base station described in the present disclosure.

Referring to FIG. 15, first, a base station may transmit, to a UE, configuration information related to a search space set in S1501. The configuration information may include information on the search space set.

For example, the configuration information may be a higher layer parameter SearchSpace.

The UE may perform a blind decoding in the search space set. The search space set may be Type0-PDCCH CSS set, Type0-PDCCH CSS set, Type1-PDCCH CSS set, Type2-PDCCH CSS set, and/or USS set.

Next, the base station may transmit a control resource set to the UE in S1502. The control resource set may consist of a plurality of resource blocks in a frequency domain, and may consist of 1, 2, or 3 symbols in a time domain. The control resource set may include a plurality of physical downlink control channel (PDCCH) candidates. The control resource set may be associated with the search space set.

The UE may perform the blind decoding for the plurality of PDCCH candidates included in the control resource set based on the configuration information in S1403.

The UE may perform the blind decoding for the plurality of PDCCH candidates included in the control resource set in the search space set.

A demodulation reference signal (DMRS) may be received per control resource set and may be used in channel estimation for demodulation of the plurality of PDCCH candidates. For example, the demodulation reference signal may be received on a first symbol or a first symbol and a second symbol of the control resource set. That is, the demodulation reference signal may be received on the first symbol of the control resource set, and may be used in the channel estimation for demodulation of all the PDCCH candidates included in the control resource set. Hence, the present disclosure can reduce the number of channel estimations.

And/or, time domain information in which the demodulation reference signal is received may be pre-defined, or may be received from the base station via higher layer signal. And/or, the demodulation reference signal may be transmitted from the base station in the same pattern as a demodulation reference signal pattern of a physical downlink shared channel (PDSCH).

And/or, whether to apply the demodulation reference signal may be configured on a per search space set basis, on a per control resource set basis, or on a per specific time basis. For example, the UE may also receive an individual demodulation reference signal. The individual demodulation reference signal may be received per PDCCH candidate, and may mean a demodulation reference signal used in channel estimation for demodulation of each PDCCH candidate. In this instance, the UE may be configured, from the base station, with whether to use the demodulation reference signal or the individual demodulation reference signal on a per search space set basis, on a per control resource set basis, or on a per specific time basis.

For example, if whether to apply the demodulation reference signal is configured on a per search space set basis, the UE may perform decoding on the assumption that the individual demodulation reference signal is not transmitted to the PDCCH candidates in the search space set that is configured to apply the demodulation reference signal, and may perform decoding on the assumption that the individual demodulation reference signal is transmitted to the PDCCH candidates in the search space set that is configured not to apply the demodulation reference signal. And/or, the UE may assume the same quasi co-location (QCL) between the search space sets to which the demodulation reference signal is applied.

For another example, if whether to apply the demodulation reference signal is configured on a per control resource set basis, the UE may perform the channel estimation on all the PDCCH candidates in the control resource set, that is configured to apply the demodulation reference signal, using the demodulation reference signal, and may perform the channel estimation on each of the PDCCH candidates in the control resource set, that is configured to apply the individual demodulation reference signal, using the individual demodulation reference signal.

For another example, if whether to apply the demodulation reference signal is configured on a per specific time basis, the UE may perform the channel estimation on the PDCCH candidates included in each control resource set using the demodulation reference signal of each control resource set included in a specific time unit that is configured to apply the demodulation reference signal, and may perform the channel estimation on the PDCCH candidates included in a specific time unit, that is configured not to apply the demodulation reference signal, using each individual demodulation reference signal. The specific time unit may be pre-defined, or received from the base station via higher layer signal. The specific time unit may be one or more symbols, one or more mini-slots, one or more slots, one or more subframes, or a combination thereof.

And/or, the plurality of PDCCH candidates may be PDCCH candidates of a specific aggregation level. For example, the demodulation reference signal may be used in the channel estimation for demodulation of PDCCH candidates of aggregation level 4 among the PDCCH candidates included in the control resource set.

And/or, the demodulation reference signal may be transmitted over all frequency bands or a specific frequency band of the control resource set. And/or, the demodulation reference signal may be transmitted over all frequency bands or a specific frequency band in a specific pattern.

Since the operation method of the base station described with reference to FIG. 15 is the same as the operation method of the base station described with reference to FIGS. 1 to 14, a further description thereof is omitted.

With regard to this, the above-described operation of the base station can be implemented in detail by a base station 1610 illustrated in FIG. 16. For example, the above-described operation of the base station can be performed by a processor 1611 and/or an RF unit 1613.

Referring to FIG. 16, first, the processor 1611 may transmit, to a UE, configuration information related to a search space set through the RF unit 1613, in S1501. The configuration information may include information on the search space set.

For example, the configuration information may be a higher layer parameter SearchSpace.

The UE may perform a blind decoding in the search space set. The search space set may be Type0-PDCCH CSS set, Type0-PDCCH CSS set, Type1-PDCCH CSS set, Type2-PDCCH CSS set, and/or USS set.

Next, the processor 1611 may transmit a control resource set to the UE through the RF unit 1613 in S1502. The control resource set may consist of a plurality of resource blocks in a frequency domain, and may consist of 1, 2, or 3 symbols in a time domain. The control resource set may include a plurality of physical downlink control channel (PDCCH) candidates. The control resource set may be associated with the search space set.

Next, the UE may perform the blind decoding for the plurality of PDCCH candidates included in the control resource set based on the configuration information.

The UE may perform the blind decoding for the plurality of PDCCH candidates included in the control resource set in the search space set.

A demodulation reference signal (DMRS) may be received per control resource set and may be used in channel estimation for demodulation of the plurality of PDCCH candidates. For example, the demodulation reference signal may be received on a first symbol or a first symbol and a second symbol of the control resource set. That is, the demodulation reference signal may be received on the first symbol of the control resource set, and may be used in the channel estimation for demodulation of all the PDCCH candidates included in the control resource set. Hence, the present disclosure can reduce the number of channel estimations.

And/or, time domain information in which the demodulation reference signal is received may be pre-defined, or may be received from the base station via higher layer signal. And/or, the demodulation reference signal may be transmitted from the base station in the same pattern as a demodulation reference signal pattern of a physical downlink shared channel (PDSCH).

And/or, whether to apply the demodulation reference signal may be configured on a per search space set basis, on a per control resource set basis, or on a per specific time basis. For example, the UE may also receive an individual demodulation reference signal. The individual demodulation reference signal may be received per PDCCH candidate, and may mean a demodulation reference signal used in channel estimation for demodulation of each PDCCH candidate. In this instance, the UE may be configured, from the base station, with whether to use the demodulation reference signal or the individual demodulation reference signal on a per search space set basis, on a per control resource set basis, or on a per specific time basis.

For example, if whether to apply the demodulation reference signal is configured on a per search space set basis, the UE may perform decoding on the assumption that the individual demodulation reference signal is not transmitted to the PDCCH candidates in the search space set that is configured to apply the demodulation reference signal, and may perform decoding on the assumption that the individual demodulation reference signal is transmitted to the PDCCH candidates in the search space set that is configured not to apply the demodulation reference signal. And/or, the UE may assume the same quasi co-location (QCL) between the search space sets to which the demodulation reference signal is applied.

For another example, if whether to apply the demodulation reference signal is configured on a per control resource set basis, the UE may perform the channel estimation on all the PDCCH candidates in the control resource set, that is configured to apply the demodulation reference signal, using the demodulation reference signal, and may perform the channel estimation on each of the PDCCH candidates in the control resource set, that is configured to apply the individual demodulation reference signal, using the individual demodulation reference signal.

For another example, if whether to apply the demodulation reference signal is configured on a per specific time basis, the UE may perform the channel estimation on the PDCCH candidates included in each control resource set using the demodulation reference signal of each control resource set included in a specific time unit that is configured to apply the demodulation reference signal, and may perform the channel estimation on the PDCCH candidates included in a specific time unit, that is configured not to apply the demodulation reference signal, using each individual demodulation reference signal. The specific time unit may be pre-defined, or received from the base station via higher layer signal. The specific time unit may be one or more symbols, one or more mini-slots, one or more slots, one or more subframes, or a combination thereof.

And/or, the plurality of PDCCH candidates may be PDCCH candidates of a specific aggregation level. For example, the demodulation reference signal may be used in the channel estimation for demodulation of PDCCH candidates of aggregation level 4 among the PDCCH candidates included in the control resource set.

And/or, the demodulation reference signal may be transmitted over all frequency bands or a specific frequency band of the control resource set. And/or, the demodulation reference signal may be transmitted over all frequency bands or a specific frequency band in a specific pattern.

Since the operation of the base station described with reference to FIG. 16 is the same as the operation of the base station described with reference to FIGS. 1 to 15, a further description thereof is omitted.

Overview of Device to which the Present Disclosure is Applicable

FIG. 16 illustrates an example of an internal block diagram of a wireless communication device to which the present disclosure is applicable.

Referring to FIG. 16, a wireless communication system includes a base station 1610 and multiple UEs 1620 located in an area of the base station. Hereinafter, the base station 1610 and the UEs 1620 may be referred to as wireless devices.

The base station 1610 includes a processor 1611, a memory 1612, and a radio frequency (RF) unit 1613. The processor 1611 implements functions, processes, and/or methods described in FIGS. 1 to 15. Layers of radio interface protocol may be implemented by the processor 1611. The memory 1612 is connected to the processor 1611 and stores various types of information for driving the processor 1611. The RF unit 1613 is connected to the processor 1611 and transmits and/or receives radio signals.

The UE 1620 includes a processor 1621, a memory 1622, and a RF unit 1623. The processor 1621 implements functions, processes, and/or methods described in FIGS. 1 to 15. Layers of radio interface protocol may be implemented by the processor 1621. The memory 1622 is connected to the processor 1621 and stores various types of information for driving the processor 1621. The RF unit 1623 is connected to the processor 1621 and transmits and/or receives radio signals.

The memories 1612 and 1622 may be inside or outside the processors 1611 and 1621 and may be connected to the processors 1611 and 1621 through various well-known means.

The memories 1612 and 1622 may store programs for the processing and control of the processors 1611 and 1621 and may temporarily store input/output information.

The memories 1612 and 1622 may serve as buffers.

Further, the base station 1610 and/or the UE 1620 may have a single antenna or multiple antennas.

Figure 17:
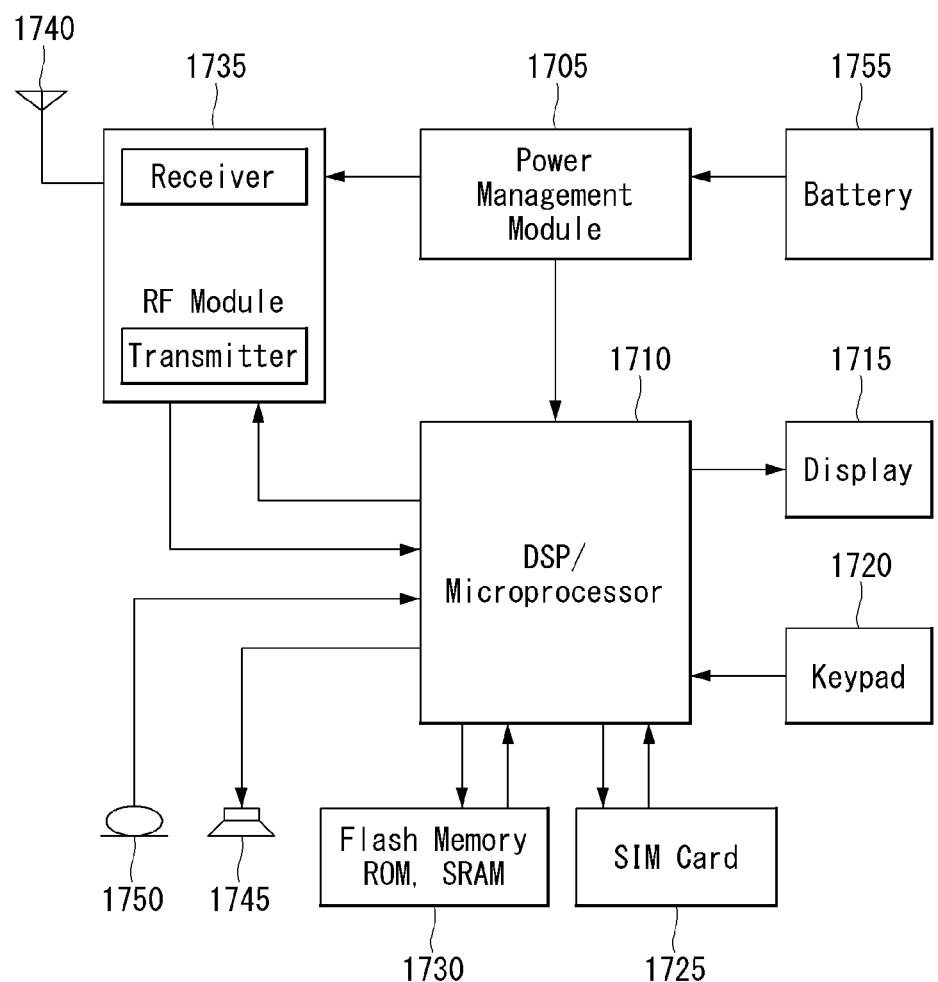
FIG. 17 illustrates a block configuration diagram of a communication device according to an embodiment of the present disclosure.

FIG. 17 illustrates a block configuration diagram of a communication device according to an embodiment of the present disclosure.

In particular, FIG. 17 illustrates in more detail the UE illustrated in FIG. 16.

Referring to FIG. 17, the UE may include a processor (or digital signal processor (DSP)) 1710, an RF module (or RF unit) 1735, a power management module 1705, an antenna 1740, a battery 1755, a display 1715, a keypad 1720, a memory 1730, a subscriber identification module (SIM) card 1725 (which is optional), a speaker 1745, and a microphone 1750. The UE may also include a single antenna or multiple antennas.

The processor 1710 implements functions, processes, and/or methods described in FIGS. 1 to 16. Layers of a radio interface protocol may be implemented by the processor 1710.

The memory 1730 is connected to the processor 1710 and stores information related to operations of the processor 1710. The memory 1730 may be inside or outside the processor 1710 and may be connected to the processors 1710 through various well-known means.

A user inputs instructional information, such as a telephone number, for example, by pushing (or touching) buttons of the keypad 1720 or by voice activation using the microphone 1750. The processor 1710 receives and processes the instructional information to perform an appropriate function, such as to dial the telephone number. Operational data may be extracted from the SIM card 1725 or the memory 1730. Further, the processor 1710 may display instructional information or operational information on the display 1715 for the user's reference and convenience.

The RF module 1735 is connected to the processor 1710 and transmits and/or receives a RF signal. The processor 1710 sends instructional information to the RF module 1735 in order to initiate communication, for example, transmit a radio signal configuring voice communication data. The RF module 1735 consists of a receiver and a transmitter to receive and transmit the radio signal. The antenna 1740 functions to transmit and receive the radio signal. Upon reception of the radio signal, the RF module 1735 may send a signal to be processed by the processor 1710 and convert the signal into a baseband. The processed signal may be converted into audible or readable information output via the speaker 1745.

Figure 18:
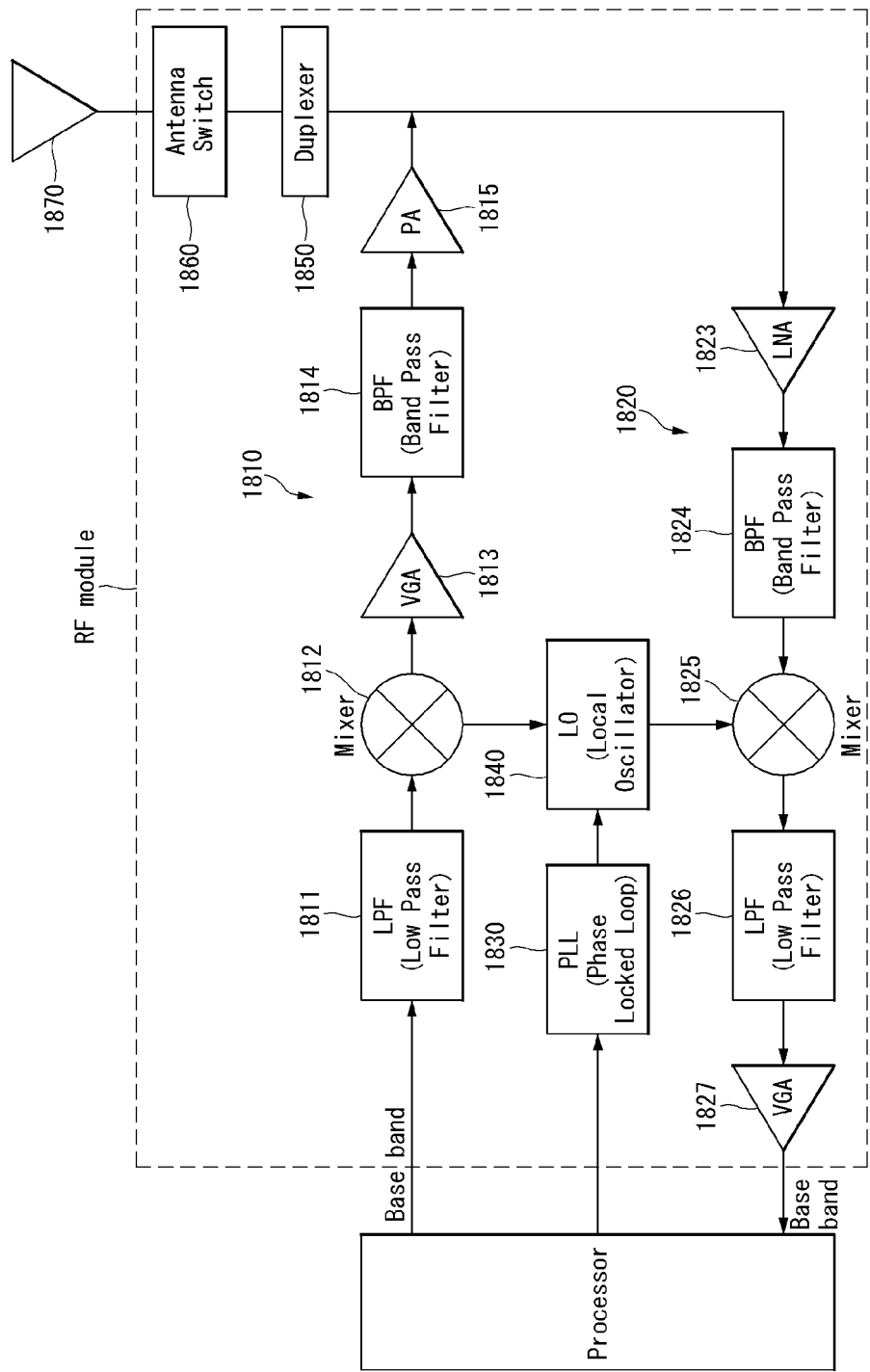
FIG. 18 illustrates an example of a RF module of a wireless communication device to which a method described in the present disclosure is applicable.

FIG. 18 illustrates an example of a RF module of a wireless communication device to which a method described in the present disclosure is applicable.

More specifically, FIG. 18 illustrates an example of an RF module that can be implemented in a frequency division duplex (FDD) system.

First, in a transmission path, the processor described in FIGS. 16 and 17 processes data to be transmitted and provides an analog output signal to a transmitter 1810.

In the transmitter 1810, the analog output signal is filtered by a low pass filter (LPF) 1811 to remove images caused by a digital-to-analog conversion (ADC), is up-converted from a baseband to an RF by an up-converter (mixer) 1812, and is amplified by a variable gain amplifier (VGA) 1813. The amplified signal is filtered by a filter 1814, is additionally amplified by a power amplifier (PA) 1815, is routed through duplexer(s) 1850/antenna switch(es) 1860, and is transmitted through an antenna 1870.

Further, in a reception path, the antenna 1870 receives signals from the outside and provides the received signals, and the signals are routed through the antenna switch(s) 1860/duplexers 1850 and are provided to a receiver 1820.

In the receiver 1820, the received signals are amplified by a low noise amplifier (LNA) 1823, are filtered by a bans pass filter 1824, and are down-converted from the RF to the baseband by a down-converter (mixer) 1825.

The down-converted signal is filtered by a low pass filter (LPF) 1826 and is amplified by a VGA 1827 to obtain an analog input signal, and the analog input signal is provided to the processor described in FIGS. 16 and 17.

Further, a local oscillator (LO) generator 1840 generates transmitted and received LO signals and provides them to each of the up-converter 1812 and the down-converter 1825.

In addition, a phase locked loop (PLL) 1830 receives control information from the processor in order to generate the transmitted and received LO signals at appropriate frequencies and provides control signals to the LO generator 1840.

The circuits illustrated in FIG. 18 may be arranged differently from the configuration illustrated in FIG. 18.

Figure 19:
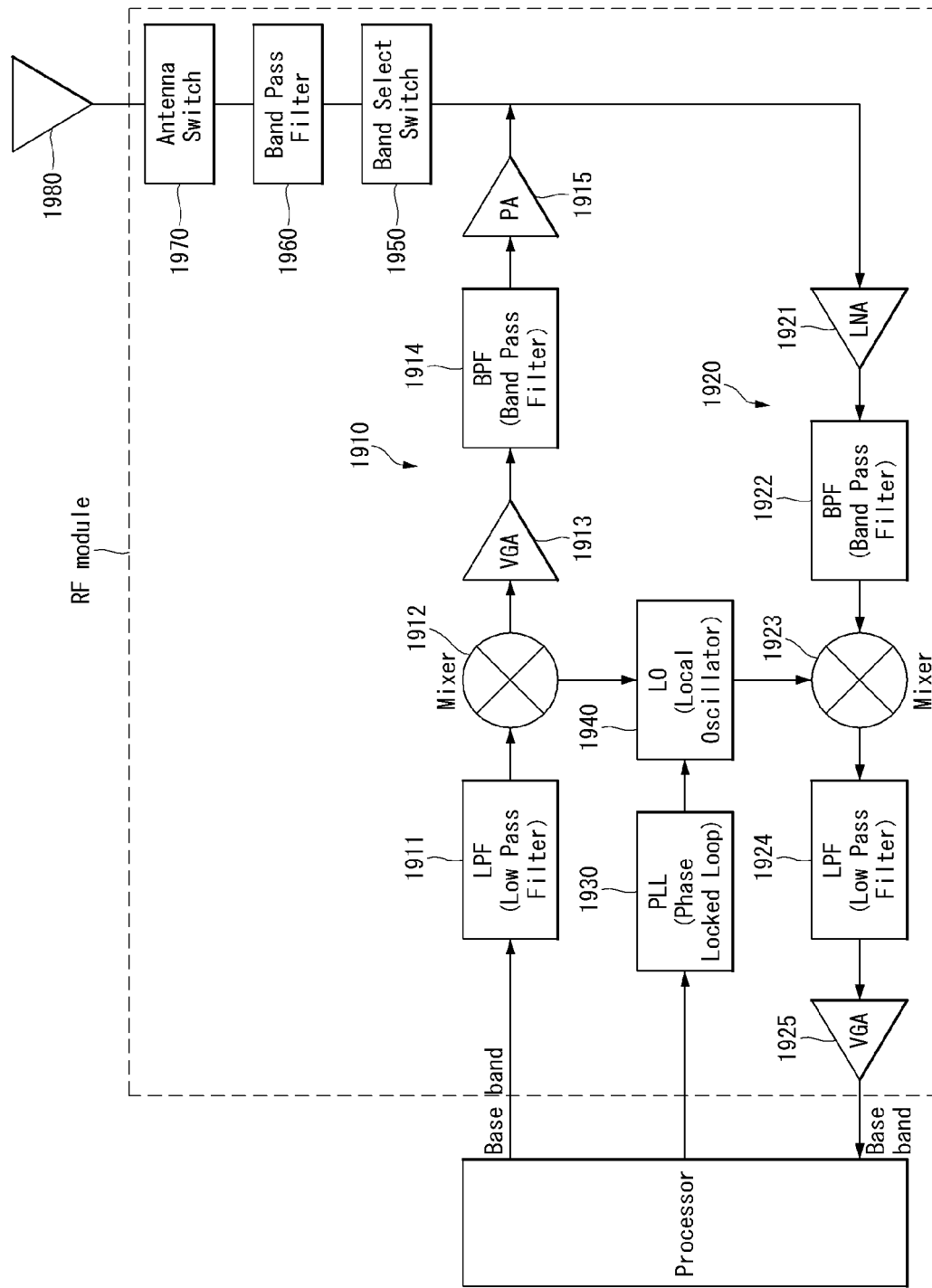
FIG. 19 illustrates another example of a RF module of a wireless communication device to which a method described in the present disclosure is applicable.

FIG. 19 illustrates another example of a RF module of a wireless communication device to which a method described in the present disclosure is applicable.

More specifically, FIG. 19 illustrates an example of an RF module that can be implemented in a time division duplex (TDD) system.

A transmitter 1910 and a receiver 1920 of the RF module in the TDD system have the same structure as the transmitter and the receiver of the RF module in the FDD system.

Only the structure of the RF module of the TDD system that differs from the RF module of the FDD system will be described below, and the same structure refers to the description of FIG. 18.

A signal amplified by a power amplifier (PA) 1915 of the transmitter 1910 is routed through a band select switch 1950, a band pass filter (BPF) 1960, and antenna switch(s) 1970 and is transmitted via an antenna 1980.

Further, in a reception path, the antenna 1980 receives signals from the outside and provides the received signals, and the signals are routed through the antenna switch(s) 1970, the band pass filter 1960, and the band select switch 1950 and are provided to the receiver 1920.

Figure 20:
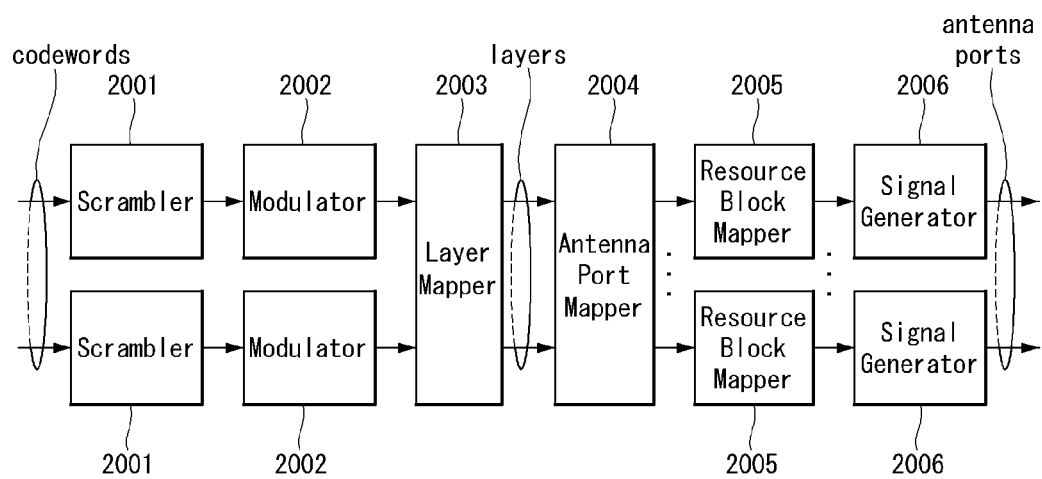
FIG. 20 illustrates an example of a signal processing module to which methods described in the present disclosure are applicable.

FIG. 20 illustrates an example of a signal processing module to which methods described in the present disclosure are applicable.

FIG. 20 illustrates an example of a signal processing module structure in a transmitting device.

Hereinafter, the UE or the base station of FIG. 16 may be referred to as a transmitting device or a receiving device.

The signal processing may be performed by the processor of the base station/UE such as the processors 1611 and 1621 of FIG. 16.

Referring to FIG. 20, a transmitting device in a UE or a base station may include a scrambler 2001, a modulator 2002, a layer mapper 2003, an antenna port mapper 2004, a resource block mapper 2005, and a signal generator 2006.

The transmitting device may transmit one or more codewords. Each of coded bits in each codeword may be scrambled by the scrambler 2001 and transmitted on a physical channel. The codeword may be referred to as a data column and may be equivalent to a transport block that is a data block provided by a MAC layer.

The scrambled bits are modulated to complex-valued modulation symbols by the modulator 2002. The modulator 2002 may modulate the scrambled bits according to a modulation scheme and dispose the modulated bits as complex-valued modulation symbols representing a location on signal constellation. There is no restriction in the modulation scheme, and m-PSK (m-Phase Shift Keying) or m-QAM (m-Quadrature Amplitude Modulation), etc. may be used in the modulation of coded data. The modulator may be referred to as a modulation mapper.

The complex-valued modulation symbols may be mapped to one or more transport layers by the layer mapper 2003. The complex-valued modulation symbol on each layer may be mapped by the antenna port mapper 2004 for the transmission on an antenna port.

The resource block mapper 2005 may map the complex-valued modulation symbol for each antenna port to an appropriate resource element within a virtual resource block allocated for the transmission. The resource block mapper 2005 may map the virtual resource block to a physical resource block according to an appropriate mapping scheme. The resource block mapper 2005 may allocate the complex-valued modulation symbol for each antenna port to an appropriate subcarrier and multiplex it according to a user.

The signal generator 2006 may modulate the complex-valued modulation symbol, i.e., an antenna-specific symbol for each antenna port through a specific modulation scheme, for example, an orthogonal frequency division multiplexing (OFDM) scheme to generate a complex-valued time domain OFDM symbol signal. The signal generator 2006 may perform an inverse fast Fourier transform (IFFT) on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 2006 may include an IFFT module, a CP inserter, a digital-to-analog converter (DAC), a frequency up-converter, and the like.

Figure 21:
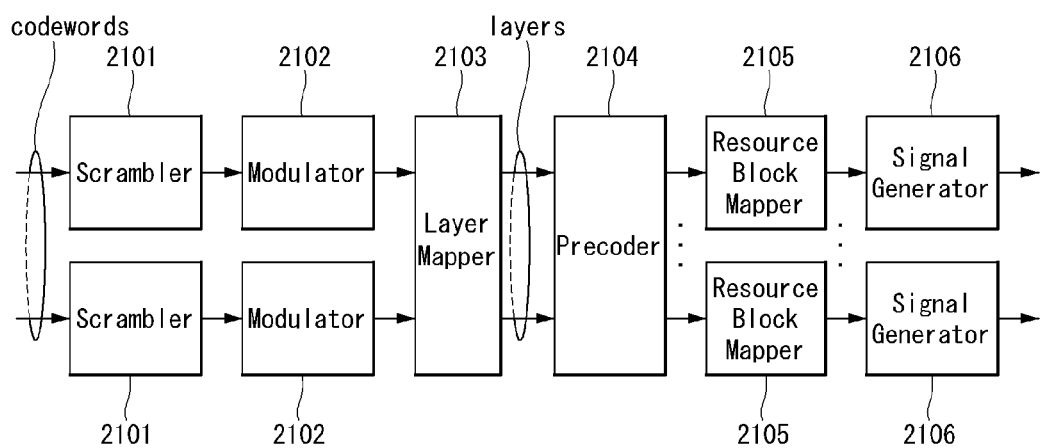
FIG. 21 illustrates another example of a signal processing module to which methods described in the present disclosure are applicable.

FIG. 21 illustrates another example of a signal processing module to which methods described in the present disclosure are applicable.

FIG. 21 illustrates another example of a signal processing module structure in a base station or a UE. The signal processing may be performed by processors of a base station/UE such as the processors 1611 and 1621 of FIG. 16.

Referring to FIG. 21, a transmitting device in a UE or a base station may include a scrambler 2101, a modulator 2102, a layer mapper 2103, a precoder 2104, a resource block mapper 2105, and a signal generator 2106.

The transmitting device may scramble coded bits within one codeword for the one codeword by the scrambler 2101 and then transmit it via a physical channel.

The scrambled bits are modulated to complex-valued modulation symbols by the modulator 2102. The modulator 2102 may modulate the scrambled bits according to a predetermined modulation scheme and dispose the modulated bits as complex-valued modulation symbols representing a location on signal constellation. There is no restriction in the modulation scheme, and pi/2-BPSK (pi/2-Binary Phase Shift Keying), m-PSK (m-Phase Shift Keying), or m-QAM (m-Quadrature Amplitude Modulation), etc. may be used in the modulation of coded data.

The complex-valued modulation symbols may be mapped to one or more transport layers by the layer mapper 2103.

The complex-valued modulation symbol on each layer may be precoded by the precoder 2104 for the transmission on an antenna port. Here, the precoder 2104 may perform a transform precoding on the complex-valued modulation symbols and then perform a precoding on the complex-valued modulation symbols. Alternatively, the precoder 2104 may perform the precoding on the complex-valued modulation symbols without performing the transform precoding. The precoder 2104 may process the complex-valued modulation symbols through a MIMO scheme according to multiple transmitting antennas to output antenna-specific symbols and may distribute the antenna-specific symbols to the corresponding resource block mapper 2105. An output z of the precoder 2104 may be obtained by multiplying an output y of the layer mapper 2103 by a precoding matrix W of N×M, where N is the number of antenna ports, and M is the number of layers.

The resource block mapper 2105 maps the complex-valued modulation symbol for each antenna port to an appropriate resource element within a virtual resource block allocated for the transmission.

The resource block mapper 2105 may allocate the complex-valued modulation symbols to appropriate subcarriers and multiplex them according to a user.

The signal generator 2106 may modulate the complex-valued modulation symbols through a specific modulation scheme, for example, an orthogonal frequency division multiplexing (OFDM) scheme to generate a complex-valued time domain OFDM symbol signal. The signal generator 2106 may perform an inverse fast Fourier transform (IFFT)

on the antenna-specific symbol, and a cyclic prefix (CP) may be inserted into a time domain symbol on which the IFFT is performed. An OFDM symbol goes through digital-to-analog conversion, frequency up-conversion, etc. and is transmitted to the receiving device via each transmitting antenna. The signal generator 2106 may include an IFFT module, a CP inserter, a digital-to-analog converter (DAC), a frequency up-converter, and the like.

The signal processing of the receiving device may be configured in the reverse of the signal processing of the transmitter. Specifically, the processor of the receiving device performs decoding and demodulation on a radio signal received from the outside via antenna port(s) of an RF unit. The receiving device may include a plurality of multi-receiving antennas. Each signal received via the receiving antenna is recovered as a baseband signal, and then goes through multiplexing and MIMO demodulation and is recovered to a data column that the transmitting device originally intends to transmit. The receiving device may include a signal restorer for recovering a received signal as a baseband signal, a multiplexer for combining and multiplexing the received and processed signals, and a channel demodulator for modulating a multiplexed signal string to a corresponding codeword. The signal restorer, the multiplexer, and the channel demodulator may be configured as one integrated module to perform their functions or respective independent modules. More specifically, the signal restorer may include an analog-to-digital converter (ADC) for converting an analog signal into a digital signal, a CP remover for removing a CP from the digital signal, a FFT module which applies a fast Fourier transform (FFT) to a signal, from which the CP is removed, and outputs a frequency domain symbol, and a resource element demapper/an equalizer for recovering the frequency domain symbol as an antenna-specific symbol. The antenna-specific symbol is recovered to a transport layer by the multiplexer, and the transport layer is recovered by the channel demodulator to a codeword, that the transmitting device intends to transmit.

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, a CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

In the present disclosure, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), a foldable device, and the like. For example, the HMD is a display device worn on the head and may be used to implement VR or AR.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has described a method of performing blind decoding in a wireless communication system, focusing on examples applying to the 3GPP LTE/LTE-A system, the 5G system (new RAT system), etc., the present disclosure can be applied to various wireless communication systems other than these systems.

The invention claimed is:

1. A method performed by a user equipment (UE) in a wireless communication system, the method comprising:
   transmitting, to a base station, UE capability information for a maximum number of non-overlapped control channel elements (CCEs) that the UE can monitor per monitoring span;
   receiving, from the base station, configuration information related to a search space set and monitoring periodicity; and
   monitoring non-overlapped CCEs for each scheduled cell based on the maximum number of non-overlapped CCEs and the monitoring periodicity using subcarrier spacing configuration,
   wherein the UE capability information includes information related to at least one interval between monitoring spans per a numerology, and
   wherein the maximum number of non-overlapped CCEs is determined based on the at least one interval between monitoring spans and the numerology.

2. A user equipment (UE) configured to operate in a wireless communication system, the UE comprising:
   a radio frequency (RF) unit configured to transmit and receive a radio signal; and
   a processor functionally connected to the RF unit,
   wherein the processor is configured to:
   transmit, to a base station, UE capability information for a maximum number of non-overlapped control channel elements (CCEs) that the UE can monitor per monitoring span;
   receive, from the base station, configuration information related to a search space set and monitoring periodicity; and
   monitor non-overlapped CCEs for each scheduled cell based on the maximum number of non-overlapped CCEs and the monitoring periodicity using subcarrier spacing configuration,
   wherein the UE capability information includes information related to at least one interval between monitoring spans per a numerology, and
   wherein the maximum number of non-overlapped CCEs is determined based on the at least one interval between monitoring spans and the numerology.

3. At least one non-transitory computer-readable storage medium storing instructions that, when executed by at least one processor, control a user equipment (UE) to perform operations in a wireless communication system, the operations comprising:
   transmitting, to a base station, UE capability information for a maximum number of non-overlapped control channel elements (CCEs) that the UE can monitor per monitoring span;
   receiving, from the base station, configuration information related to a search space set and monitoring periodicity; and
   monitoring non-overlapped CCEs for each scheduled cell based on the maximum number of non-overlapped CCEs and the monitoring periodicity using subcarrier spacing configuration,
   wherein the UE capability information includes information related to at least one interval between monitoring spans per a numerology, and
   wherein the maximum number of non-overlapped CCEs is determined based on the at least one interval between monitoring spans and the numerology.

* * * * *